United States Patent
Gottumukkal et al.

(10) Patent No.: US 12,493,650 B2
(45) Date of Patent: Dec. 9, 2025

(54) BUILDING SECURITY SYSTEM WITH ARTIFICIAL INTELLIGENCE VIDEO ANALYSIS AND NATURAL LANGUAGE VIDEO SEARCHING

(71) Applicant: Tyco Fire & Security GmbH, Neuhausen am Rheinfall (CH)

(72) Inventors: Rajkiran Kumar Gottumukkal, Bengaluru (IN); Jayakrishna Alapati, Bangalore (IN); Deepak Chembakassery Rajendran, Thrissur (IN); Venkata Pavan Muppala, Shadnagar (IN); Srikanth Vemula, Bangalore (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/790,348

(22) Filed: Jul. 31, 2024

(65) Prior Publication Data
US 2025/0045329 A1   Feb. 6, 2025

(30) Foreign Application Priority Data
Aug. 1, 2023  (IN) .............................. 202321051518

(51) Int. Cl.
| | |
|---|---|
| G06F 16/70 | (2019.01) |
| G06F 16/738 | (2019.01) |
| G06F 16/75 | (2019.01) |
| G06F 16/783 | (2019.01) |
| G06V 20/52 | (2022.01) |

(52) U.S. Cl.
CPC ........ *G06F 16/7837* (2019.01); *G06F 16/738* (2019.01); *G06F 16/75* (2019.01); *G06V 20/52* (2022.01)

(58) Field of Classification Search
CPC ..... G06F 16/7837; G06F 16/75; G06F 16/738
See application file for complete search history.

(56) References Cited

U.S. PATENT DOCUMENTS

| | | | |
|---|---|---|---|
| 9,256,807 B1 * | 2/2016 | Shlens | ................. G06F 16/739 |
| 11,195,401 B2 | 12/2021 | Pourmohammad | |
| 11,341,186 B2 | 5/2022 | Bender et al. | |
| 11,468,677 B2 | 10/2022 | Zadeh et al. | |

(Continued)

OTHER PUBLICATIONS

European Search Report on EP Appl. No. 24191949.7 dated Dec. 20, 2024 (8 pages).

(Continued)

*Primary Examiner* — Kristopher Andersen
(74) *Attorney, Agent, or Firm* — Foley & Lardner LLP

(57) ABSTRACT

A building security system is configured to apply classifications to video files using an artificial intelligence (AI) model. The classifications include one or more objects or events recognized in the video files by the AI model. The system is configured to extract one or more entities from a search query received via a user interface. The entities include one or more objects or events indicated by the search query. The system is configured to search the video files using the classifications applied by the AI model and the one or more entities extracted from the search query and present one or more of the video files identified as results of the search query as playable videos via the user interface.

19 Claims, 21 Drawing Sheets

(56) References Cited

U.S. PATENT DOCUMENTS

| | | |
|---|---|---|
| 11,657,465 B2 | 5/2023 | Ranjan et al. |
| 2020/0142365 A1 | 5/2020 | Sharma et al. |
| 2020/0302177 A1 | 9/2020 | Nguyen |
| 2023/0076241 A1* | 3/2023 | Kulandai Samy ..... G06V 10/25 |
| 2023/0140369 A1 | 5/2023 | Aminian et al. |
| 2023/0205817 A1 | 6/2023 | Janakiraman et al. |

OTHER PUBLICATIONS

U.S. Appl. No. 18/419,442, filed Jan. 22, 2024, Brown et al.
U.S. Appl. No. 18/419,449, filed Jan. 22, 2024, Brown et al.
U.S. Appl. No. 18/419,456, filed Jan. 22, 2024, Brown et al.
U.S. Appl. No. 18/631,678, filed Apr. 10, 2024, Selvaraj et al.
U.S. Appl. No. 18/633,024, filed Apr. 11, 2024, Brown et al.
U.S. Appl. No. 18/633,040, filed Apr. 11, 2024, Brown et al.
U.S. Appl. No. 18/633,049, filed Apr. 11, 2024, Brown et al.
U.S. Appl. No. 18/633,068, filed Apr. 11, 2024, Brown et al.
U.S. Appl. No. 18/633,086, filed Apr. 11, 2024, Brown et al.
U.S. Appl. No. 18/633,097, filed Apr. 11, 2024, Brown et al.
U.S. Appl. No. 18/661,045, filed May 10, 2024, Goyal et al.
U.S. Appl. No. 18/663,793, filed May 14, 2024, Makowski et al.
U.S. Appl. No. 18/759,267, filed Jun. 28, 2024, Brown et al.
U.S. Appl. No. 18/771,622, filed Jul. 12, 2024, Kumar et al.

* cited by examiner

Foundational AI

- Task specific AI → Multiple domains
- Popular Foundational Models : GPT, BERT, DALL-E, CLIP[1]
- CLIP4Clip[2] model : Video-text retrieval model based on CLIP
  - Image-Text model : Pretrained on 400M image-text caption data from web
  - Video-Text model : Fine-tuned on 10K and 150K video-task caption data
  - Fine-tuned with food, entertainment, sports etc. ... video clips

FIG. 5

BUILDING SECURITY SYSTEM WITH ARTIFICIAL INTELLIGENCE VIDEO ANALYSIS AND NATURAL LANGUAGE VIDEO SEARCHING

CROSS-REFERENCE TO RELATED PATENT APPLICATION

This application claims the benefit of and priority to Indian Provisional Patent Application No. 202321051518 filed Aug. 1, 2023, the entire disclosure of which is incorporated by reference herein.

BACKGROUND

The present disclosure relates generally to security systems for buildings. The present disclosure relates to building security systems configured to analyze and present video data from cameras or other visual data sources.

SUMMARY

One implementation of the present disclosure is a method for classifying and searching video files in a building security system. The method includes applying classifications to video files using an artificial intelligence (AI) model. The classifications include one or more objects or events recognized in the video files by the AI model. The method includes extracting one or more entities from a search query received via a user interface. The entities include one or more objects or events indicated by the search query. The method includes searching the video files using the classifications applied by the AI model and the one or more entities extracted from the search query and presenting one or more of the video files identified as results of the search query as playable videos via the user interface.

The AI model may include at least one of a foundation AI model, a generative AI model, or a large language model.

The search query may be a natural language search query including freeform text or verbal inputs provided by a user via the user interface. The method may include extracting the one or more entities from the natural language search query using natural language processing.

The method may include extracting two or more entities from the search query and discerning an intended relationship between the two or more entities based on information linking the two or more entities in the search query. Searching the video files may include using the intended relationship in combination with the two or more entities to identify one or more of the video files classified as having the two or more entities linked by the intended relationship.

The method may include adding supplemental annotations to the video files using the AI model. The supplemental annotations may mark an area or location within a video frame of the video files at which a particular object or event is depicted in the video frame. Presenting one or more of the video files may include presenting the supplemental annotations overlaid with the video frame via the user interface.

Applying the classifications to the video files may include processing a timeseries of video frames of a video file recorded over a time period using the AI model to identify an event that begins at a start time during the time period and ends at an end time during the time period and applying a classification to the video file that identifies the event, the start time of the event, and the end time of the event.

The video files may be recorded by one or more cameras and the classifications are applied to the video files during a first time period to generate a database of pre-classified video files. The search query may be received via the user interface during a second time period after the first time period. Searching the video files may include searching the database of the pre-classified video files using the one or more entities extracted from the search query after the video files are classified.

The search query may be received via the user interface and the one or more entities are extracted from the search query during a first time period to generate a stored rule based on the search query. The video files may include live video streams received from one or more cameras and the classifications may be applied to the live video streams during a second time period after the first time period. Searching the video files may include searching the live video streams using the stored rule to determine whether the one or more entities extracted from the search query are depicted in the live video streams.

The video files may be recorded by one or more cameras over a time period. Applying the classifications to the video files may include determining a time of the time period at which the one or more objects or events appear in a video file using the AI model and applying a classification to the video file that identifies the one or more objects or events and a time at which the one or more objects or events appear in the video file.

Searching the video files may include identifying time segments of the video files during which the one or more entities extracted from the search query appear in the video files using the AI model. Presenting the video files may include presenting one or more snippets of the video files during which the one or more entities extracted from the search query appear as indicated by the time segments.

The method may include performing or triggering an automated action in response to detecting the one or more objects or events indicated by the search query in the video files. The automated action may include at least one of sending an alert to a user indicating the one or more objects or events detected in the video files, raising an alarm indicating the one or more objects or events, dispatching security personnel to respond to the one or more objects or events, controlling or shutting-down building equipment to address a fault condition indicated by the one or more objects or events, locking one or more doors in response to detecting the one or more objects or events, and/or any other action that can be performed or triggered in the context of a building security system or building management system.

The method may include cutting the video files to create one or more snippets of the video files based on an output of the AI model indicating one or more times at which the one or more entities extracted from the search query appear in the video files and presenting the one or more snippets of the video files as the results of the search query via the user interface.

Searching the video files may include determining a relevance score or ranking for each of the video files using the classifications applied by the AI model and the one or more entities extracted from the search query. The method may include presenting the relevance score or ranking for each of the video files presented as results of the search query via the user interface.

Another implementation of the present disclosure is a system for classifying and searching video files in a building security system. The system includes one or more processing circuits comprising one or more processors and memory storing instructions that, when executed by the one or more processors, cause the one or more processors to perform operations. The operations include applying classifications to video files using an artificial intelligence (AI) model. The classifications include one or more objects or events recognized in the video files by the AI model. The operations further include extracting one or more entities from a search query received via a user interface. The entities include one or more objects or events indicated by the search query. The operations further include searching the video files using the classifications applied by the AI model and the one or more entities extracted from the search query and presenting one or more of the video files identified as results of the search query as playable videos via the user interface.

The AI model may include at least one of a foundation AI model, a generative AI model, or a large language model.

The search query may be a natural language search query including freeform text or verbal inputs provided by a user via the user interface. The operations may include extracting the one or more entities from the natural language search query using natural language processing.

The operations may include extracting two or more entities from the search query and discerning an intended relationship between the two or more entities based on information linking the two or more entities in the search query. Searching the video files may include using the intended relationship in combination with the two or more entities to identify one or more of the video files classified as having the two or more entities linked by the intended relationship.

The operations may include adding supplemental annotations to the video files using the AI model. The supplemental annotations may mark an area or location within a video frame of the video files at which a particular object or event is depicted in the video frame. Presenting one or more of the video files may include presenting the supplemental annotations overlaid with the video frame via the user interface.

Applying the classifications to the video files may include processing a timeseries of video frames of a video file recorded over a time period using the AI model to identify an event that begins at a start time during the time period and ends at an end time during the time period and applying a classification to the video file that identifies the event, the start time of the event, and the end time of the event.

The video files may be recorded by one or more cameras and the classifications are applied to the video files during a first time period to generate a database of pre-classified video files. The search query may be received via the user interface during a second time period after the first time period. Searching the video files may include searching the database of the pre-classified video files using the one or more entities extracted from the search query after the video files are classified.

The search query may be received via the user interface and the one or more entities are extracted from the search query during a first time period to generate a stored rule based on the search query. The video files may include live video streams received from one or more cameras and the classifications may be applied to the live video streams during a second time period after the first time period. Searching the video files may include searching the live video streams using the stored rule to determine whether the one or more entities extracted from the search query are depicted in the live video streams.

The video files may be recorded by one or more cameras over a time period. Applying the classifications to the video files may include determining a time of the time period at which the one or more objects or events appear in a video file using the AI model and applying a classification to the video file that identifies the one or more objects or events and a time at which the one or more objects or events appear in the video file.

Searching the video files may include identifying time segments of the video files during which the one or more entities extracted from the search query appear in the video files using the AI model. Presenting the video files may include presenting one or more snippets of the video files during which the one or more entities extracted from the search query appear as indicated by the time segments.

The operations may include performing or triggering an automated action in response to detecting the one or more objects or events indicated by the search query in the video files. The automated action may include at least one of sending an alert to a user indicating the one or more objects or events detected in the video files, raising an alarm indicating the one or more objects or events, dispatching security personnel to respond to the one or more objects or events, controlling or shutting-down building equipment to address a fault condition indicated by the one or more objects or events, locking one or more doors in response to detecting the one or more objects or events, and/or any other action that can be performed or triggered in the context of a building security system or building management system.

The operations may include cutting the video files to create one or more snippets of the video files based on an output of the AI model indicating one or more times at which the one or more entities extracted from the search query appear in the video files and presenting the one or more snippets of the video files as the results of the search query via the user interface.

Searching the video files may include determining a relevance score or ranking for each of the video files using the classifications applied by the AI model and the one or more entities extracted from the search query. The operations may include presenting the relevance score or ranking for each of the video files presented as results of the search query via the user interface.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 5 illustrates several types of AI models which can be used in the video analysis and search system of FIG. 4, according to some implementations.

DETAILED DESCRIPTION

Referring generally to the FIGURES, a building security system with natural language video searching is shown, according to an exemplary implementation. The security system may be used in a building, facility, campus, or other physical location to analyze video data received from cameras or other input devices. The security system may use an artificial intelligence model (e.g., a foundation AI model) to recognize particular objects, events, or other entities in video data and may add supplemental annotations to a video stream denoting the recognized objects or events. In response to detecting a predetermined object or event, the security system may trigger a particular action such as sending an alert to a user, raising an alarm, dispatching security personnel to respond to the event or object, etc.

The security system may include a video search system configured to analyze and search video data for specified objects or events. The video search system may use natural language processing to parse a natural language input from a user and extract relevant entities (e.g., objects, events, etc.) from the natural language input. The natural language input can include freeform text, verbal or audio input, or any other modality of user input. The video search system may then the extracted entities as search parameters for the AI model to identify video clips that contain the objects, events, or other entities. The video clips can be presented via a user interface based on relevancy and can be viewed or played directly from the user interface.

The video search system can refine or update the search results based on additional input provided via the natural language interface. For example, the AI model can be configured to engage in natural language conversation with a user via the user interface (e.g., functioning as a chat bot) and ask the user questions to help refine the search query and the set of search results. In this way, the user can provide more specific input and the AI model can assist the user in providing additional information to return more relevant, additional, or specific search results. As another example, the initial set of search results may include a video file that depicts a particular person of interest (e.g., a suspected trespasser, a particular employee, etc.). Upon selecting or viewing the initial search results or video file, the user may ask the AI model to "show me all videos or images with this person" and the AI model may run an updated search to find other videos and/or images depicting the same person. These and other features and advantages of the building security system and video analysis and search system are described in greater detail below.

Figure 1:
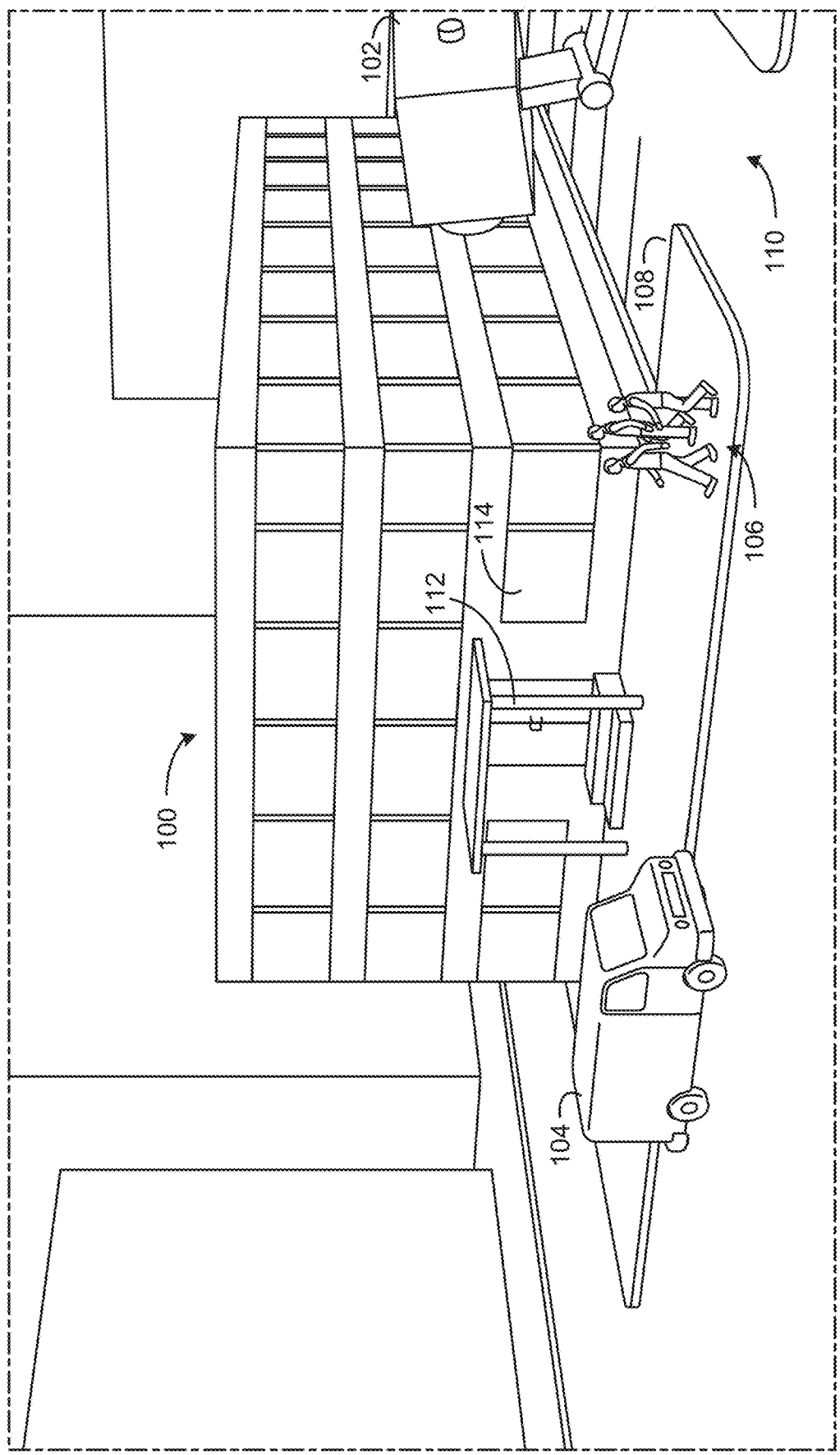
FIG. 1 is a perspective view schematic drawing of a building with a security system, according to some implementations.

Referring now to FIG. 1, among others, a building 100 with a security camera 102 and a parking lot 110 is shown, according to an exemplary implementation. The building 100 is shown as a multi-story commercial building surrounded by, or near, the parking lot 110 but can be any type of building. The building 100 may be a school, a hospital, a store, a place of business, a residence, a hotel, an office building, an apartment complex, etc. The building 100 can be associated with the parking lot 110.

Both the building 100 and the parking lot 110 are at least partially in the field of view of the security camera 102. Multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. busses, cars, trucks, delivery vehicles). The building 100 and parking lot 110 can be further used by one or more pedestrians 106 who can traverse the parking lot 110 and/or enter and/or exit the building 100. The building 100 may be further surrounded, or partially surrounded, by a sidewalk 108 to facilitate the foot traffic of one or more pedestrians 106, facilitate deliveries, etc. In various implementations, the building 100 may be one of many buildings belonging to a single industrial park, shopping mall, or commercial park having a common parking lot and security camera 102. In another implementation, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. The doors can be secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

Figure 2:
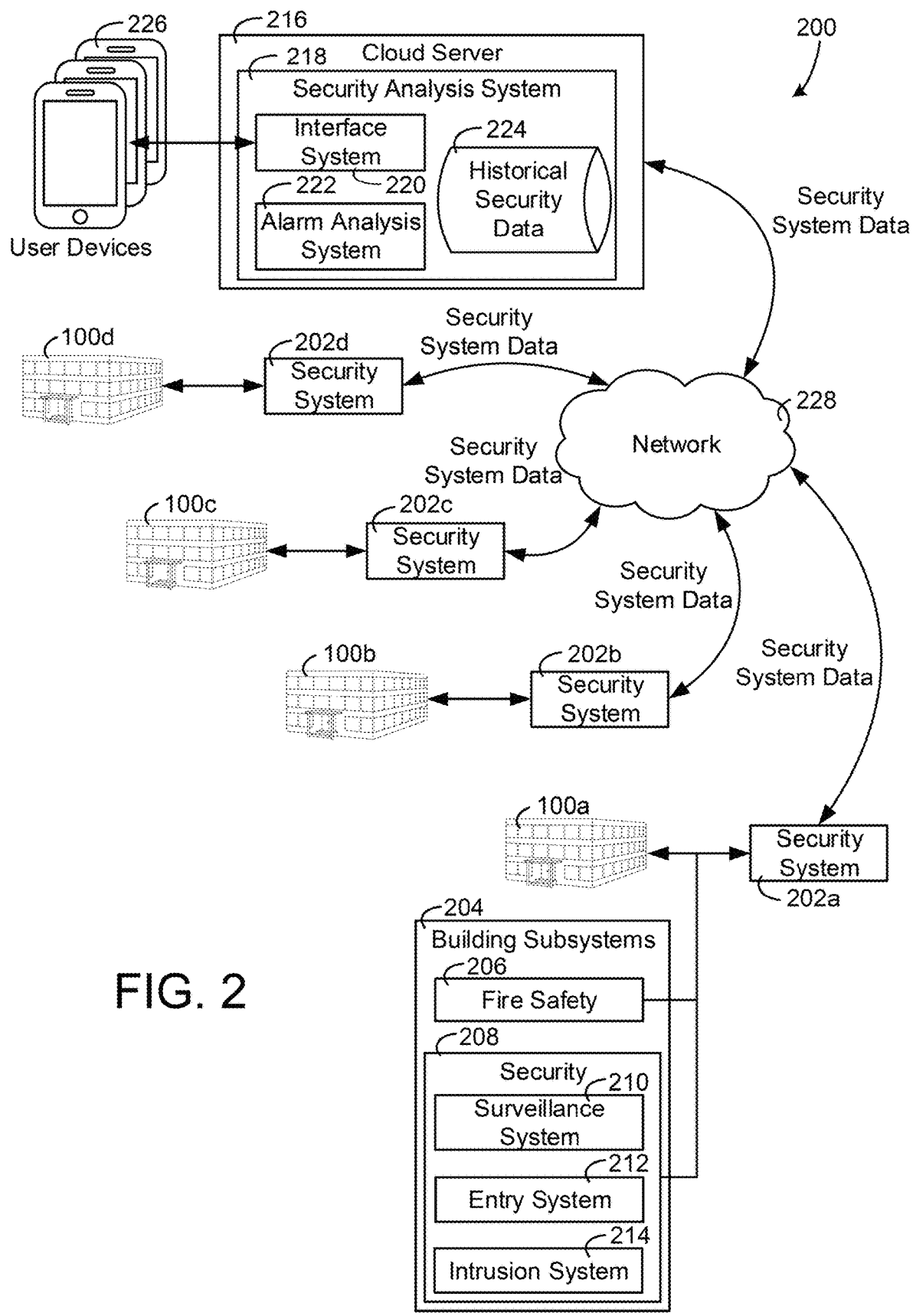
FIG. 2 is a block diagram of building security systems for multiple buildings communicating with a cloud-based security system, according to some implementations.

Referring now to FIG. 2, a security system 200 is shown for multiple buildings, according to an exemplary implementation. The security system 200 is shown to include buildings 100a-100d. Each of buildings 100a-100d is shown to be associated with a security system 202a-202d. The buildings 100a-100d may be the same as and/or similar to building 100 as described with reference to FIG. 1. The security systems 202a-202d may be one or more controllers, servers, and/or computers located in a security panel or part of a central computing system for a building.

The security systems 202a-202d may communicate with, or include, various security sensors and/or actuators, building subsystems 204. For example, fire safety subsystems 206 may include various smoke sensors and alarm devices, carbon monoxide sensors, alarm devices, etc. Security subsystems 208 are shown to include a surveillance system 210, an entry system 212, and an intrusion system 214. The surveillance system 210 may include various video cameras, still image cameras, and image and/or video processing systems for monitoring various rooms, hallways, parking lots, the exterior of a building, the roof of the building, etc. The entry system 212 can include one or more systems configured to allow users to enter and exit the building (e.g., door sensors, turnstiles, gated entries, badge systems, etc.) The intrusion system 214 may include one or more sensors configured to identify whether a window or door has been forced open. The intrusion system 214 can include a keypad module for arming and/or disarming a security system and various motion sensors (e.g., IR, PIR, etc.) configured to detect motion in various zones of the building 100a.

Each of buildings 100a-100d may be located in various cities, states, and/or countries across the world. There may be any number of buildings 100a-100d. The buildings 100a-100d may be owned and operated by one or more entities. For example, a grocery store entity may own and operate buildings 100a-100d in a particular geographic state. The security systems 202a-202d may record data from the building subsystems 204 and communicate collected security system data to the cloud server 216 via network 228.

The network 228 can communicatively couple the devices, systems, and servers of the system 200. The network 228 can be at least one of and/or a combination of a Wi-Fi network, a wired Ethernet network, a ZigBee network, a Bluetooth network, and/or any other wireless network. The network 228 may be a local area network and/or a wide area network (e.g., the Internet, a building WAN, etc.) and may use a variety of communications protocols (e.g., BACnet, IP, LON, etc.). The network 228 may include routers, modems, and/or network switches. The network 228 may be a combination of wired and wireless networks.

The cloud server 216 is shown to include a security analysis system 218 that receives the security system data from the security systems 202a-202d of the buildings 100a-100d. The cloud server 216 may include one or more processing circuits (e.g., memory devices, processors, databases) configured to perform the various functionalities described herein. The cloud server 216 may be a private server. The cloud server 216 can be implemented by a cloud system, examples of which include AMAZON WEB SERVICES® (AWS) and MICROSOFT AZURE®.

A processing circuit of the cloud server 216 can include one or more processors and memory devices. The processor can be a general purpose or specific purpose processor, an application specific integrated circuit (ASIC), one or more field programmable gate arrays (FPGAs), a group of processing components, or other suitable processing components. The processor may be configured to execute computer code and/or instructions stored in a memory or received from other computer readable media (e.g., CDROM, network storage, a remote server, etc.).

The memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuit and can include computer code for executing (e.g., by the processor) one or more processes described herein.

The cloud server 216 can be located on premises within one of the buildings 100a-100d. For example, a user may wish that their security, fire, or HVAC data remain confidential and have a lower risk of being compromised. In such an instance, the cloud server 216 may be located on-premises instead of within an off-premises cloud platform.

The security analysis system 218 may implement an interface system 220, an alarm analysis system 222, and a database storing historical security data 224, security system data collected from the security systems 202a-202d. The interface system 220 may provide various interfaces of user devices 226 for monitoring and/or controlling the security systems 202a-202d of the buildings 100a-100d. The interfaces may include various maps, alarm information, maintenance ordering systems, etc. The historical security data 224 can be aggregated security alarm and/or event data collected via the network 228 from the buildings 100a-100d. The alarm analysis system 222 can be configured to analyze the aggregated data to identify insights, detect alarms, reduce false alarms, etc. The analysis results of the alarm analysis system 222 can be provided to a user via the interface system 220. The results of the analysis performed by the alarm analysis system 222 can be provided as control actions to the security systems 202a-202d via the network 228.

Figure 3:
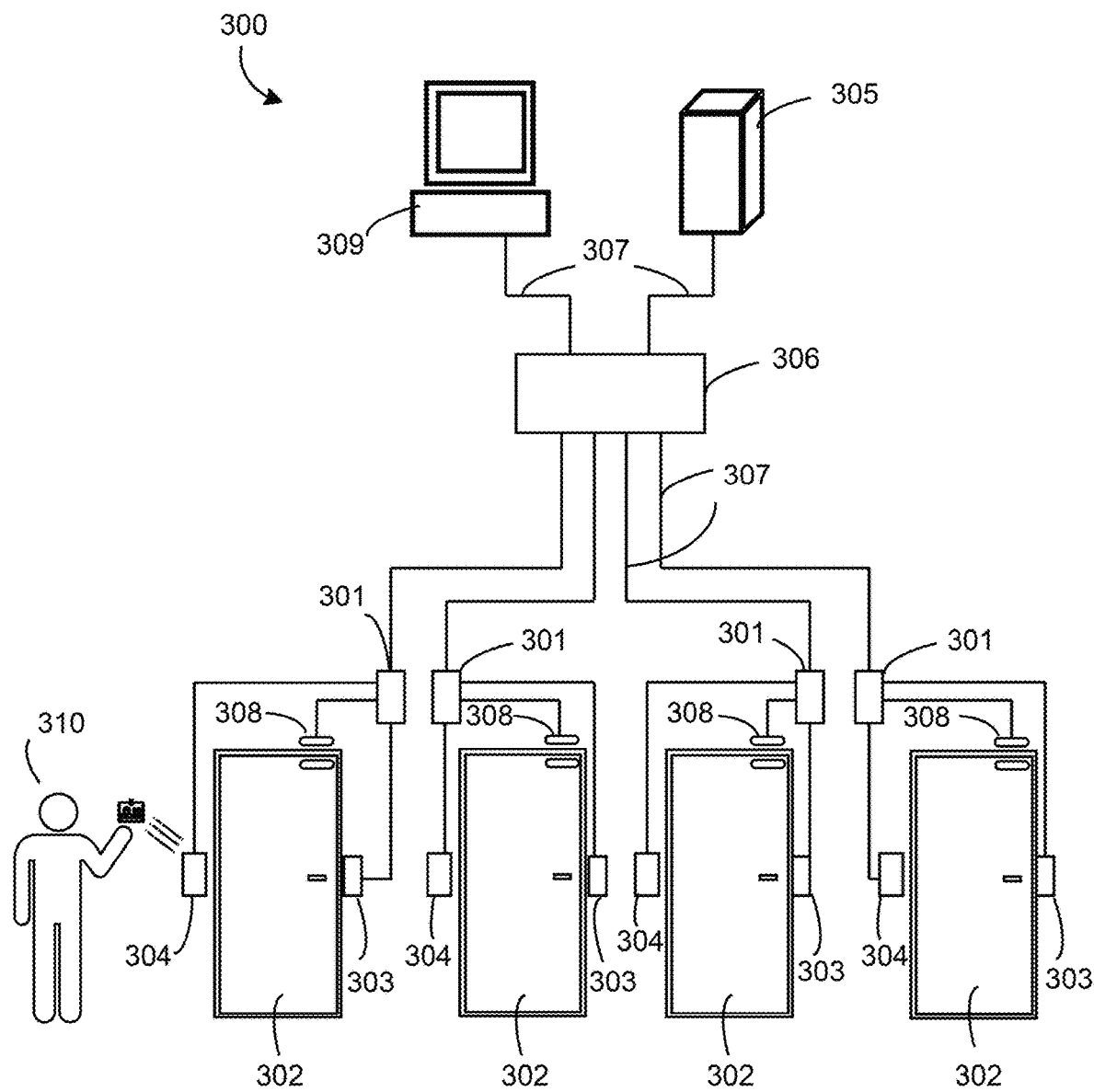
FIG. 3 is a block diagram illustrating several components of an access control system (ACS) that can be implemented in the building security systems of FIG. 2, according to some implementations.

Referring now to FIG. 3, a block diagram of an ACS 300 is shown, according to an exemplary implementation. The ACS 300 can be implemented in any of the buildings 100a-100d as described with reference to FIG. 2. The ACS 300 is shown to include a plurality of doors 302. Each of the doors 302 is associated with a door lock 303, an access reader module 304, and one or more door sensors 308. The door locks 303, the access reader modules 304, and the door sensors 308 may be connected to access controllers 301. The access controllers 301 may be connected to a network switch 306 that directs signals, according to the configuration of the ACS 300, through network connections 307 (e.g., physical wires or wireless communications links) interconnecting the access controllers 301 to an ACS server 305 (e.g., the cloud server 216). The ACS server 305 may be connected to an end-user terminal or interface 309 through network switch 306 and the network connections 307.

The ACS 300 can be configured to grant or deny access to a controlled or secured area. For example, a person 310 may approach the access reader module 304 and present credentials, such as an access card. The access reader module 304 may read the access card to identify a card ID or user ID associated with the access card. The card ID or user ID may be sent from the access reader module 304 to the access controller 301, which determines whether to unlock the door lock 303 or open the door 302 based on whether the person 310 associated with the card ID or user ID has permission to access the controlled or secured area.

Figure 4:
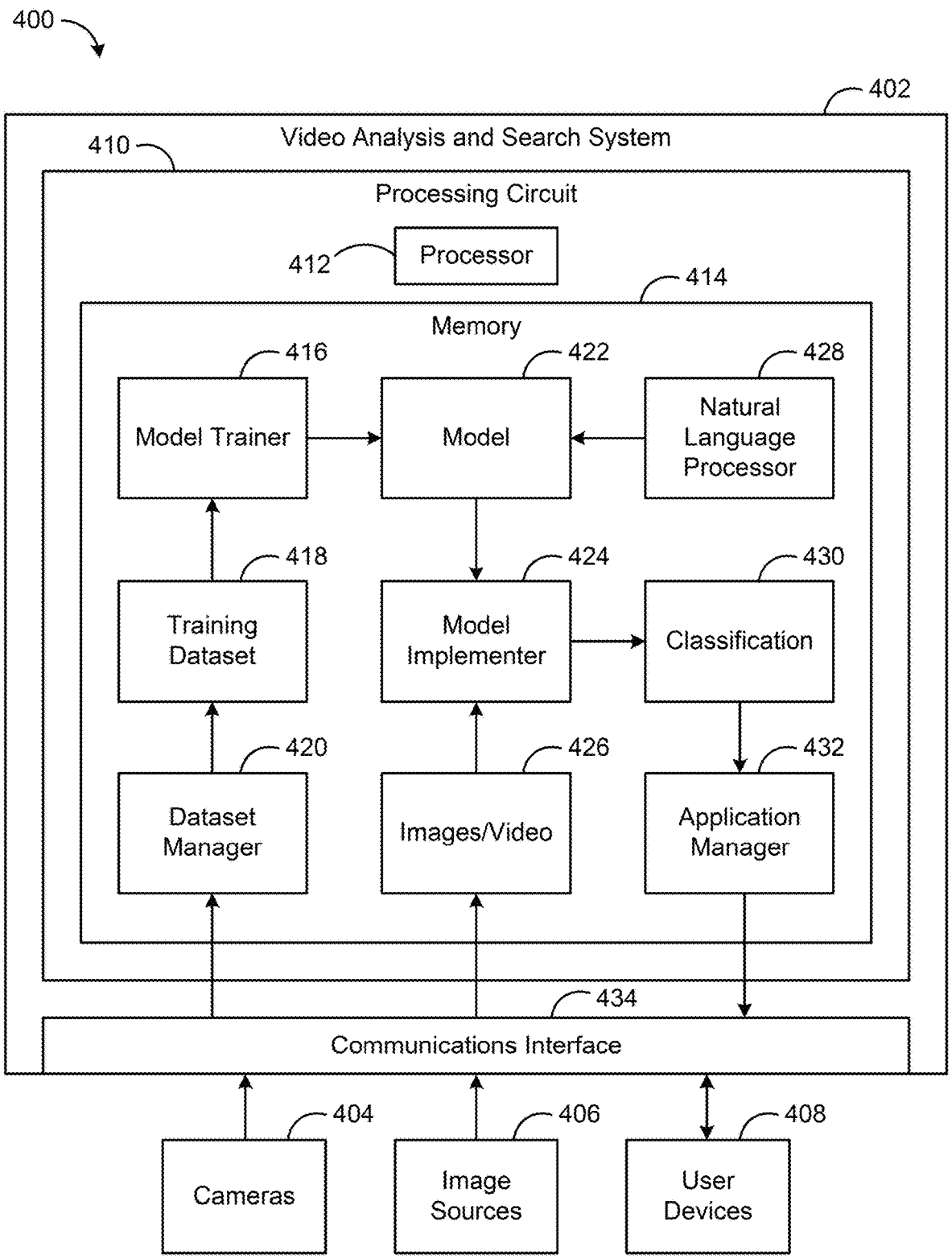
FIG. 4 is a block diagram of a security system including a video analysis and search system including a model trained to recognize objects and events in video data, according to some implementations.

Referring now to FIG. 4, among others, a block diagram of a security system 400 is shown, according to an exemplary implementation. The security system 400 can be or include one or more of the security systems 202a-202d and/or the security analysis system 218 shown in FIG. 2. The security system 400 is shown to include cameras 404, images sources 406, user devices 408, and a video analysis and search system 402. The cameras 404 may include video cameras, surveillance cameras, perimeter cameras, still image cameras, motion activated cameras, infrared cameras, or any other type of camera that can be used in a security system. The images sources 406 can be cameras or other types of image sources such as a computing system, database, and/or server system. The cameras 404 and the images sources 406 can be configured to provide video clips, a video feed, images, or other type of visual data to the video analysis and search system 402.

The video analysis and search system 402 can be configured to receive and store the images and video received from the cameras 404 and images sources 406 and process the stored images/video for training and executing a video classification model 422, according to an exemplary implementation. The video analysis and search system 402 can be implemented as part of a security system of the building 100 as described with reference to FIG. 1, as part of the vehicle 104 as described with reference to FIG. 1, etc. The video analysis and search system 402 can be configured to be implemented by a cloud computing system. The cloud computing system can include one or more controllers, servers, and/or any other computing device that can be located remotely and/or connected to the systems of the building 100 via networks (e.g., the Internet). The cloud computing system can include any of the components or features of the cloud server 216 shown in FIG. 2.

The video analysis and search system 402 is shown to include a communications interface 434 and a processing circuit 410. The communications interface 434 may include wired or wireless interfaces (e.g., jacks, antennas, transmitters, receivers, transceivers, wire terminals, etc.) for conducting data communications with various systems, devices, or networks. For example, the communications interface 434 may include an Ethernet card and port for sending and receiving data via an Ethernet-based communications network and/or a Wi-Fi transceiver for communicating via a wireless communications network. The communications interface 434 may be configured to communicate via local area networks or wide area networks (e.g., the Internet, a building WAN, etc.) and may use a variety of communications protocols (e.g., BACnet, IP, LON, etc.).

The processing circuit 410 is shown to include a processor 412 and a memory 414. The processor 412 can be implemented as a general purpose processor, an ARM processor, an application specific integrated circuit (ASIC), one or more field programmable gate arrays (FPGAs), a group of processing components, or other suitable electronic processing components. The memory 414 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory 414 can be or include volatile memory and/or non-volatile memory. The memory 414 can include object code components, script components, or any other type of information structure for supporting the various activities and information structures described in the present application. According to some implementations, the memory 414 is communicably connected to the processor 412 via the processing circuit 410 and can include computer code for executing (e.g., by the processing circuit 410 and/or the processor 412) one or more processes or functionality described herein.

The video analysis and search system 402 is shown to include a dataset manager 420 configured to identify images, objects, or other items in the group of images/video 426 provided by the cameras 404 and images sources 406 into distinct categories based on subject matter. The dataset manager 420 can be configured to categorize or label all images/video 426 provided by the cameras 404 and images sources 406 and/or categorize the video images based on labels included with the images/video 426. The dataset manager 420 can be configured to generate a training dataset 418 using all or a portion of the images/video 426 from the cameras 404 and images sources 406. The training dataset 418 can alternatively be created from video clips collected from a web database. The video clips in the training dataset 418 can be given captions by human annotators. A different model could also or alternatively generate the captions given to the video clips in the training dataset 418. The dataset manager 420 can use some or all of the techniques described in U.S. patent application Ser. No. 18/663,793 filed May 14, 2024, and/or U.S. patent application Ser. No. 18/771,622 filed Jul. 12, 2024, to generate the training dataset 418. The entire disclosures of both these patent applications are incorporated by reference herein.

The training dataset 418 can contain images separated into object of interest classes and foreign object classes. Each object of the interest classes can be configured as a finite group of known images or videos of objects that the video analysis and search system 402 may be configured to identify. The object of interest classes may include one or more images or videos derived from one or more of the cameras 404 or image sources 406. The object of interest class can be configured as a group of images/videos 426 representing a variety of objects, shapes, features, and edges that form one or more objects of interest that the video analysis and search system 402 can be configured to recognize. The one or more foreign object classes can be a finite group of images/videos 426 of objects which may partially occlude an image of the object of interest image classes when analyzed by the video analysis and search system 402. The one or more foreign object classes can be configured as a group of images/videos 426 representing a variety of objects, shapes, features, and edges that form a foreign object or a group of foreign objects which may partially occlude one or more objects of interest contained within the object of interest classes.

The training dataset 418 is then provided as input to a model trainer 416 which is used to train the model 422 of the video analysis and search system 402 to identify an object of interest or multiple objects of interest based on the images/videos 426 of the object of interest class. The model trainer 416 may be a component of the video analysis and search system 402 or a separate component which trains the model 422 offline. For example, the model 422 may be a pretrained model provided as an input to the video analysis and search system 402. Alternatively or additionally, the model trainer 416 can train the model 422 using the images/videos 426 or using a separate dataset of videos or video clips (e.g., collected from a web database, movies, etc.) and captions provided by human annotators. The model trainer 416 can also be configured to train the model 422 of the video analysis and search system 402 to remove foreign objects that might partially occlude an object of interest based on the images/videos 426 of the foreign object class. Generally, the model trainer 416 will produce a more accurate image/video classification model 422 if the training dataset 418 includes many images in both the objects of interest class and the foreign object class.

The images of objects of the foreign class and the class of objects of interest that are divided into the object of interest class and the foreign object class can be images of different objects such that, for a particular object, that particular object only occurs in one of the sets. In this regard, the dataset manager 420 can be configured to cause the images of objects to be split up such that no images of the same object are in both sets. Examples of images of objects of interest and/or images of foreign objects include images of snow, rain, dust, dirt, windows, glass, cars, people, animals, a parking lot, a sidewalk, a building, a sign, a shelf, a door, a chair, a bicycle, a cup, a parking lot with snow, a parking lot with no snow, a parking space with snow, a parking space with no snow, a parking space with a car, a parking space with no car, and/or any other object.

The model trainer 416 can train the model to recognize various objects, actions, or other elements of interest in the images/video 426. Examples of actions include a person walking, a person running, a vehicle moving, a door opening or closing, a person digging, a person breaking a lock, fence, or other barrier, or any other action which may be relevant for the purposes of monitoring and responding to the images/videos provided by the cameras 404 and image sources 406. Recognizing actions can be based on still images from the cameras 404 and image sources 406 and/or videos provided by video cameras or other data sources. For example, the model trainer 416 can receive a timeseries or set of video frames as an input and can recognize an action based on multiple video frames (e.g., a time segment or period of video data). Although cameras 404 and image sources 406 are described as the primary type of data sources used by the video analysis and search system 402, it is contemplated that the same or similar analysis can be applied to other types of input data such as audio inputs from microphones, readings from motion sensors, door open/close data, or any other type of data received as input in a security system.

The model trainer 416 can be configured to train the model 422 using one or more training methodologies including gradient descent, back-propagation, transfer learning, max pooling, batch normalization, etc. For example, the model trainer 416 can be configured to train the model 422 from scratch, i.e., where the model has no prior training from some prior training data. In other implementations, the model trainer 416 is configured to train the model 422 using a transfer learning process, wherein the model 422 has previously been trained to accomplish a different set of tasks and is repurposed to identify and remove objects, features, shapes, and edges contained in the training dataset 418. The model trainer 416 can be configured to train the model 422 using a feature extraction methodology.

The model 422 can be any type of model suitable for recognizing objects, actions, or other entities in images or video. The model 422 can be an artificial intelligence (AI) model, a neural network model, a machine learning model, or the like. For example, the model 422 may include a large language model (LLM) and/or a generative artificial intelligence (GAI) model, such as a generative pre-trained transformer ("GPT") network. The model 422 can be a unimodal or multimodal network. The model 422 may include one or more of the generative AI models or any other features or functionality described in U.S. Provisional Patent Application No. 63/470,074 filed May 31, 2023, U.S. Provisional Patent Application No. 63/470,078 filed May 31, 2023, U.S. Provisional Patent Application No. 63/470,119 filed May 31, 2023, U.S. Provisional Patent Application No. 63/470,122 filed May 31, 2023, U.S. Provisional Patent Application No. 63/470,118 filed May 31, 2023, U.S. Provisional Patent Application No. 63/470,120 filed May 31, 2023, U.S. Provisional Patent Application No. 63/470,121 filed May 31, 2023, and/or U.S. Provisional Patent Application No. 63/470,123 filed May 31, 2023, the entire disclosures of which are incorporated by reference herein.

The model 422 may include a task-specific AI model and/or a general AI model which can be used in multiple domains. Non-limiting examples of AI models which could be used include GPT, BERT, DALL-E, and CLIP. Other examples include a CLIP4Clip model configured to perform video-text retrieval based on CLIP, an image-text model trained on image-text caption data (e.g., from an internet source), a video-text model trained on video-text caption data, or any other types of models configured to translate between text, images, videos, and other forms of input data (e.g., generate images based on user-specified text, find images that match user-specified text, generate or find video clips that match user-specified text, etc.).

The model 422 can be a convolutional neural network including convolutional layers, pooling layers, and output layers. Furthermore, the model 422 can include an activation subtractor. The activation subtractor can be configured to improve the accuracy of the model 422 in instances where a foreign object partially occludes an object of interest. The activation subtractor improves the accuracy of the model 422 by deactivating the activations of neurons associated with some foreign object and modifying the activations of neurons associated with objects of interest by subtracting the activation levels of all foreign objects from the activation levels of the objects of interest.

The cameras 404 and/or image sources 406 may include a security camera 102 overlooking a parking lot and building 100, as shown in FIG. 1. The cameras 404 and image sources 406 can also be configured to provide an image/video 426 to the model implementer 424. The model implementer 424 can cause the image/video classification model 422 (optionally including an activation subtractor) to operate using the images/video 426 as input. The model 422 and activation subtractor can be configured to deactivate the activation levels of the neuron activations caused by foreign object classes. The model 422 may operate to produce output in the form of an image/video classification 430 whereby the image/video 426 is classified by assigning a probability to image/video classes.

The video analysis and search system 402 is shown to include a natural language processor 428. The natural language processor 428 can be configured to receive user input (e.g., from user devices 408) in the form of natural language such as freeform text, spoken/verbal inputs, typewritten inputs, handwritten inputs, or other natural language inputs. The natural language processor 428 can be configured to extract relevant elements from the natural language inputs and may function as a natural language search system to allow a user to search the database of images/video 426 using natural language search queries. For example, the natural language processor 428 may identify particular objects, persons, actions, or other entities indicated by the natural language input from the user and may search the database of images/videos 426 for the identified entities. The natural language processor 428 can include some or all of the natural language processing features described in U.S. Pat. No. 11,195,401 granted Dec. 7, 2021, U.S. Pat. No. 11,657,465 granted May 23, 2023, and/or U.S. patent application Ser. No. 16/673,738 filed Nov. 4, 2019, the entire disclosures of which are incorporated by reference herein.

The natural language processor 428 can use the model 422 to search the images/videos 426 for the particular elements (e.g., entities) referenced in the natural language input. For example, a user could provide a natural language search query such as "A person crossing over the fence or digging tunnel near the fence. Person is wearing red shirt and black bottom." The natural language processor 428 may extract relevant elements from the natural language search query (e.g., "person," "fence," "digging," "tunnel," "red shirt," "black bottom," etc.) and may search the images/videos 426 for the extracted elements. The natural language processor 428 may use the model 422 and/or interact with the model implementer 424 to perform the search and output a classification 430 based on the results of the search. The classification 430 could include an indication of one or more images, videos, video clips, etc. (i.e., specific subsets or portions of the images/video 426) that contain one or more of the elements extracted from the natural language query.

The natural language processor 428 can be configured to discern an intent of the natural language input. For example, the natural language processor 428 can discern an intended relationship between two or more of the elements extracted from the natural language search query. The intended relationship may be a spatial relationship between two or more entities (e.g., "near," "crossing," "in," "on top of," "outside," "holding," etc.), a conjunctive relationship between two or more of the entities (e.g., "with," "and," etc.), a negative relationship between two or more of the entities (e.g., "without," "missing," etc.), or any other type of relationship that indicates a way in which two or more of the entities are related. For example, if the natural language search query is "person with baby and stroller near the escalator near the escalator," the natural language processor 428 can extract the entities of "person," "baby," "stroller," and "escalator." The natural language processor 428 can understand the word "near" in the natural language query as requiring a spatial proximity between the "escalator" entity and the other entities, and can understand the word "with" in the natural language query as requiring that all of the "person," the "baby," and the "stroller" are present.

The classification 430 can be provided as input to an application manager 432 which uses the classification 430 to perform an operation or cause an operation to be performed. The particular operation performed or triggered by the application manager 432 may depend on the classification 430. For example, the application manager 432 could utilize the classification 430 to inform a security officer or building personnel of a particular event, object, or action detected in the video data (e.g., "A person is attempting to break-in via the south entrance"). The application manager 432 can be configured to communicate with user devices 408 connecting the local network of the cameras 404 or images sources 406 (e.g., a building security network) with an external network (e.g., the Internet, a LAN, a WAN, etc.). The classification 430 can be used by the application manager 430 to notify an external system or device (e.g., law enforcement, fire department, building security, etc.), through the user devices 408, that a particular object, person, event, or other entity has been detected and that action should be taken in response.

Referring now to FIGS. 5-9, several features and advantages of the systems and method described herein are shown, according to an exemplary implementation. FIG. 5 illustrates several types of AI models which can be used including GPT, BERT, DALL-E, and CLIP. Other examples include a CLIP4Clip model configured to perform video-text retrieval based on CLIP, an image-text model trained on image-text caption data (e.g., from an internet source), a video-text model trained on video-text caption data, or any other types of models configured to translate between text, images, videos, and other forms of input data (e.g., generate images based on user-specified text, find images that match user-specified text, generate or find video clips that match user-specified text, etc.).

Figure 6:
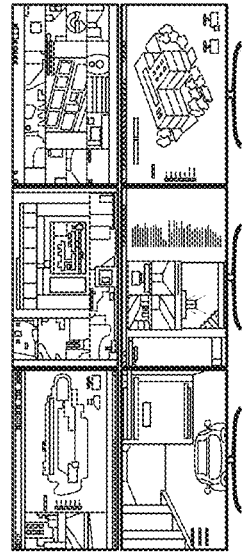
FIG. 6 illustrates an advantage of using AI models to process and search video data in the security industry, according to some implementations.
Figure 6:
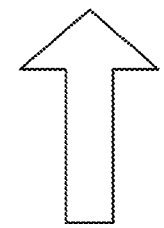
Figure 6:
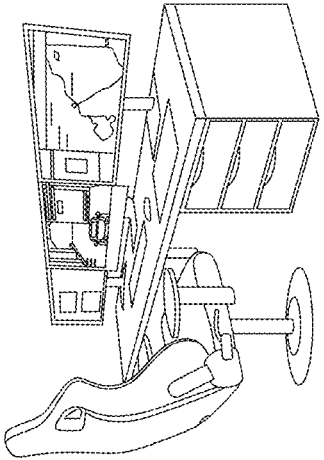

FIG. 6 illustrates an advantage of using AI models to process and search video data in the security industry. In particular, security systems often generate more video and events than humanly possible to process and existing solutions require too much time spent on reactive investigations. However, using AI models to process and search video data in the security industry can provide users with alerts, proactive, and actionable events. Using AI models to process and search video data also allows important video and events to be found more readily than existing techniques. For example, an airport may have more than 4,000 cameras that are continuously recording video data. While a human cannot feasibly process this amount of data in real-time, an AI model can ingest and process this large volume of video data and detect pertinent objects and events in real-time.

Figure 7:
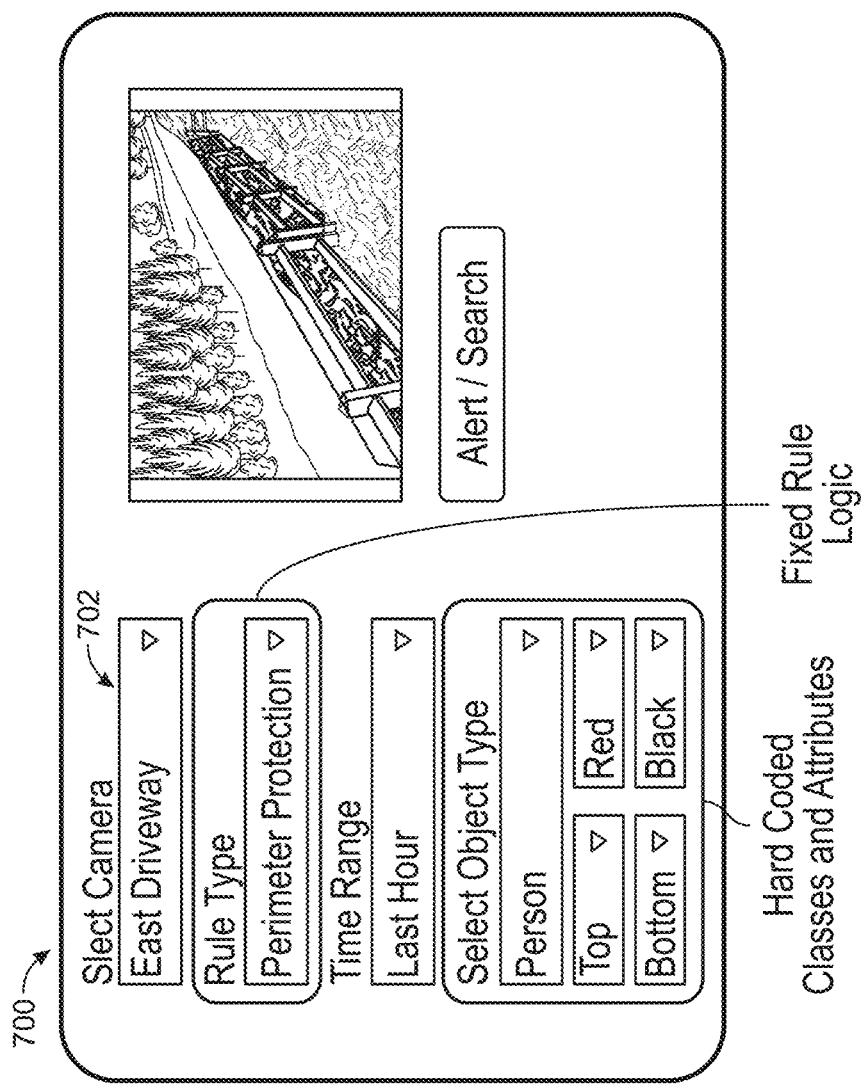
FIG. 7 illustrates an example of a user interface which can be used to provide search parameters to the model of FIG. 4 trained to recognize objects and events in video data, according to some implementations.

FIG. 7 illustrates an example of a user interface 700 which can be used to provide search parameters to a model trained to recognize objects and events in video data (e.g., the model 422 of FIG. 4). A user can interact with dropdown menus 702 to select the search parameters. For example, the user can select a particular camera (e.g., "East Driveway," "North Entrance," etc.), a particular rule type (e.g., "Perimeter Protection," "Active Shooter," etc.), a time range (e.g., "Last Hour," "Last Day," "Sep. 1, 2023," etc.), and an object type (e.g., "Person," "Vehicle," etc.) along with attributes of the selected object type such as color (e.g., "Red Top," "Black Bottom," "Blue Car") or any other attribute applicable to recognizing particular types of objects or entities. Rule types can use fixed rule logic (e.g., selecting from a predetermined list) and the object types use hard coded classes and attributes. The video analysis and searching system 402 can use the model 422 to search the selected subset of the video data (e.g., from a particular camera within the selected time range) for the selected objects matching the selected attributes.

Figure 8:
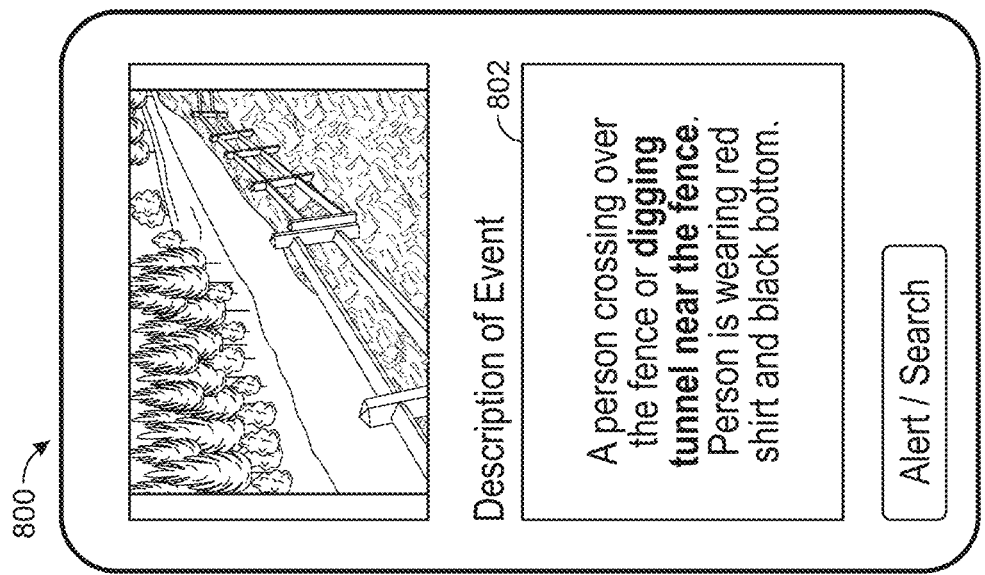
FIG. 8 illustrates another example of a user interface which can be used to provide search parameters to the model of FIG. 4 trained to recognize objects and events in video data, according to some implementations.

FIG. 8 illustrates another example of a user interface 800 which can be used to provide search parameters to a model trained to recognize objects and events in video data (e.g., the model 422 of FIG. 4). The user interface 800 of FIG. 8 allows the user to enter the search parameters using natural language text, voice data, natural language audio, handwritten notes, or any other form of natural language input. For example, a user could provide a natural language search query via natural language input 802 such as "A person crossing over the fence or digging tunnel near the fence. Person is wearing red shirt and black bottom." The natural language processor 428 may extract relevant elements from the natural language search query (e.g., "person," "fence," "digging," "tunnel," "red shirt," "black bottom," etc.) and may search the images/videos 426 for the extracted elements.

The video analysis and search system 402 can receive input from a hybrid user interface that combines features of user interface 700 and user interface 800. For example, the user interface may include one or more dropdown menus 702 as shown in FIG. 7 and one or more natural language inputs 802 as shown in FIG. 8. The dropdown menus 702 may allow the user to select a particular camera, a particular time range, a particular building or space, or any other attribute which can be selected from a predetermined list or set. As an alternative to the dropdown menus 702 or in addition to the dropdown menus 702, the user interface may include input fields that allow a user to enter a desired time range (e.g., a "start time" field and an "end time" field), a particular camera (e.g., camera name or ID), a particular building space (e.g., building ID, zone ID, etc.), or any other attribute which can be used to search the video files as input text via the user interface. The user interface may further include the natural language input 802 of user interface 800 to allow the user to provide additional search parameters as natural language text. For example, the user may select a particular time range and a particular camera (e.g., from the dropdown menus 702 or by entering text into designated fields) via the user interface and provide a natural language input in addition to the selected time range and camera.

Figure 9:
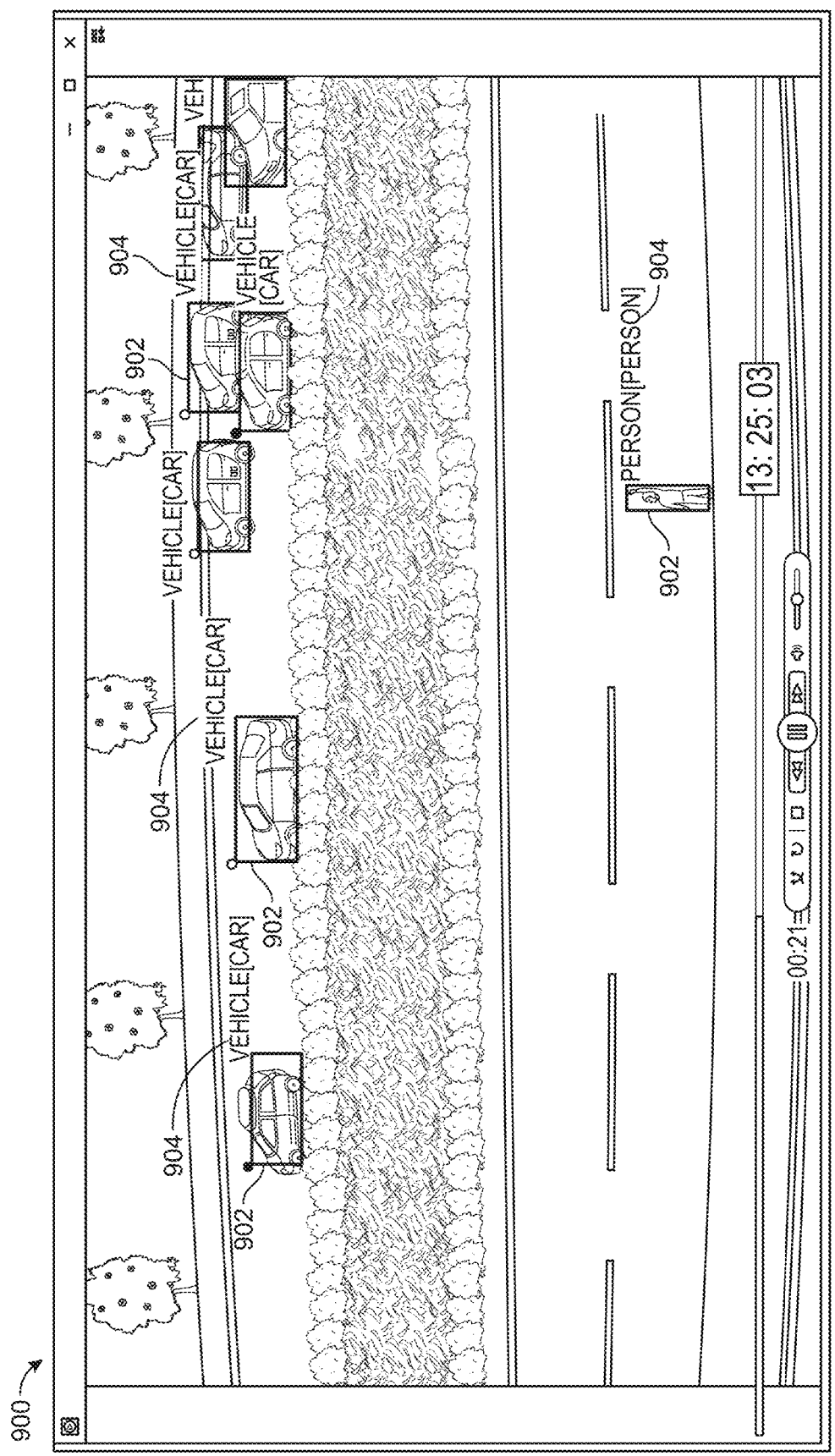
FIG. 9 illustrates an example of an augmented video feed with supplemental annotations added by the model of FIG. 4, according to some implementations.

FIG. 9 illustrates an example of an augmented video feed 900 with supplemental annotations added by the model 422 of FIG. 4. The video feed 900 may include live or recorded video data from the cameras 404 or other video or image sources 406. The model 422 may recognize particular objects or events in the video data (e.g., "vehicle (car)," "vehicle (truck)," "vehicle (emergency)," "person," "person (walking)," "fence," "equipment (chiller)," "equipment (camera)," "action (digging)," "action (walking)," "action (running)," etc.) including any of a wide variety of objects or actions which the model 422 has been trained to recognize. The model 422 may identify the particular portion of the video which includes the detected object or action (e.g., height and width coordinates or range, an area within the video, etc.) and may add a supplemental annotation 902 (e.g., a box, a circle, an arrow, etc.) marking the detected object or action within the video frame. Different types of objects or actions may be marked with different annotations (e.g., different colors, different shapes, etc.) to facilitate recognition by a user. The model 422 may add a text descriptor 904 of the recognized object or action (e.g., "vehicle (car)," "person (walking)," "fence," "action (digging)," "action (walking)," "action (running)," etc.) to the video frame proximate the location where the object or action is depicted in the video frame and/or proximate the corresponding supplemental annotation 902.

The model 422 may perform the analysis of incoming images/video 422 described with reference to FIG. 4 and add the text descriptors 904 and supplemental annotations 902 in real-time (e.g., using live streaming video data) to facilitate rapid detection of particular objects and events. The particular objects and events may be defined by stored rules generated based on a search query received via the user interface. For example, the user may provide one or more search queries via the user interface and the video analysis and search system 402 may extract entities from the search queries during a first time period to create a set of stored rules. As live streaming video data is received from the cameras 404 or image sources 406, the video analysis and search system 402 may classify the incoming video streams in real-time and apply the set of rules. In response to detecting a predetermined object or event indicated by a stored rule, the model 422 may trigger a particular action such as sending an alert to a user, raising an alarm, dispatching security personnel to respond to the event or object, etc. In other implementations, the analysis and addition of supplemental annotations 902 and text descriptors 904 by the model 422 may be performed on historical or pre-recorded video data. For example, a user may submit a search query using either of the interfaces 700 shown in FIG. 7 or 800 shown in FIG. 8 to define the search parameters for the model 422 (e.g., using drop-down menus 702 or as natural language inputs 802). The model 422 may then use the search parameters to search the video data for the particular objects or events specified by the search parameters or extracted from the natural language input 802.

Figure 10:
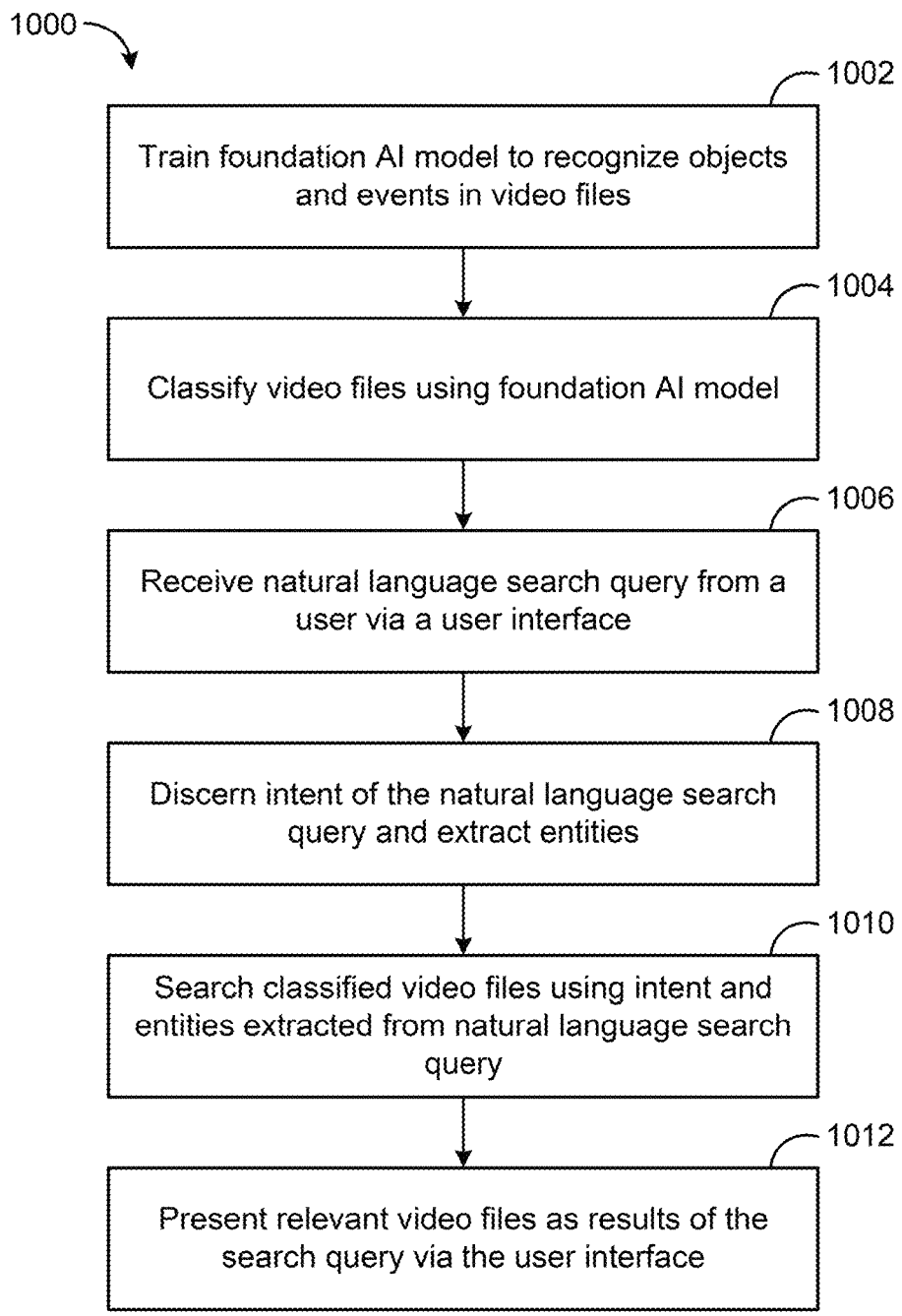
FIG. 10 is a flowchart of a process for classifying and searching video files in a building security system, according to some implementations.

Referring now to FIG. 10, a flowchart of a process 1000 for using an AI model and natural language processing to search video files is shown, according to an exemplary implementation. Process 1000 may be performed by the video analysis and search system 402 of FIG. 4 using the model 422 described with reference thereto. The model 422 used in process 1000 can be a foundation AI model and may be the same as or similar to any of the foundation AI models shown in FIG. 5. Foundation AI models or general-purpose AI (GPAI) models are capable of a range of general tasks such as text synthesis, image manipulation and generation, and audio generation. Examples of foundation AI models include the GPT-3 and GPT-4 models used in the conversational chat agent ChatGPT. Some foundation AI models are capable of taking inputs in a single modality (e.g., text) whereas other foundation AI models others are multimodal and are capable taking multiple modalities of input (e.g., text, image, video, etc.) and generating multiple types of output (e.g., generating images, summarizing text, answering questions) based on those inputs.

Process 1000 is shown to include training a foundation AI model to recognize entities (e.g., objects, persons, equipment, vehicles, etc.) and events in video files (step 1002). The foundation AI model may be capable of accepting inputs in a single modality (e.g., text, audio, video, etc.) or multiple modalities simultaneously. The foundation AI model may include a generative AI (GAI) model, a large language model (LLM), and/or other type of AI model. The foundation AI model can be a GAI model capable of generating content in one or more modalities (e.g., text, audio, video, etc.) based on user inputs such as text prompts. The foundation AI model can be a LLM capable of generating natural language responses to inputs or prompts. A LLM can, in some cases, be trained on text prediction tasks and may be capable of predicting the likelihood of a character, word or string, based on the preceding or surrounding context. For example, LLMs can predict the next most likely word in a sentence given the previous paragraph. Several examples of GAI models and LLMs which can be used in process 1000 are described in detail in U.S. Provisional Patent Application No. 63/470,074 filed May 31, 2023, U.S. Provisional Patent Application No. 63/470,078 filed May 31, 2023, U.S. Provisional Patent Application No. 63/470,119 filed May 31, 2023, U.S. Provisional Patent Application No. 63/470,122 filed May 31, 2023, U.S. Provisional Patent Application No. 63/470,118 filed May 31, 2023, U.S. Provisional Patent Application No. 63/470,120 filed May 31, 2023, U.S. Provisional Patent Application No. 63/470,121 filed May 31, 2023, and/or U.S. Provisional Patent Application No. 63/470,123 filed May 31, 2023, the entire disclosures of which are incorporated by reference herein.

Step 1002 may include training the foundation AI model using a set of training data 418 such as video files, images, text data, and corresponding classifications. The foundation AI model can be trained to recognize a variety of entities such as objects, persons, events, and other elements within the video content of a video file (e.g., within the image data as opposed to the metadata). For example, the foundation AI model can recognize the shape of a person, can distinguish an adult from a child, and can recognize other objects such as vehicles, strollers, escalators, or any other type of object or person. The foundation AI model can be trained to recognize various actions or events depicted in a video file. For example, the foundation AI model can be trained to recognize a person walking, a person running, a person or machine digging a hole, a person playing with a child, a car parking, weather conditions such as rain, snow, or wind, or other events that play out over multiple frames of the video file. The foundation AI model can be trained on a large volume of video data collected from cameras 404 or other video and/or image sources 406 in a building security system and/or other video data gathered from other sources.

Step 1002 can include training the foundation AI model with a large data set of image and text pairs (e.g., 400 million). Step 1002 may further include refining or fine-tuning the foundation AI model with a large data set (e.g., 100,000) of images, videos, and corresponding text captions. In other implementations, the foundation AI model may be pre-trained and ready for use without requiring training as part of process 1000. For example, the foundation AI model may be pre-trained to detect or identify a variety of different objects, persons, and/or events/activities without requiring extensive training as part of process 1000.

Process 1000 is shown to include classifying video files using a foundation AI model (step 1004). Step 1004 may include using the trained foundation AI model to process raw video files obtained from video cameras 404 or other image sources 406 in a building system (e.g., images/video 426) to classify them according to the persons, objects, and events depicted in the video files. The video files classified in step 1004 may be different than the video files used to train the foundation AI model in step 1002. For example, the video files used in step 1002 may be a first set of video files (e.g., historical, archived, or stored videos), whereas the video files used step 1004 may be a second set of video files (e.g., live streaming videos, different stored videos, etc.). As used herein, the term "video files" includes both electronic data files in a video format (e.g., stored videos in .mp4, .mkv, or any other video format, container format, or file extension) as well as streaming video or live video (e.g., audio/video transport streams) received from cameras 404 or other image sources 406 in real-time. Additionally, a video file may include both a video stream and an audio stream (e.g., if received from a video camera 404 with a microphone) or may include only a video stream (e.g., if the video camera 404 does not include a microphone).

Step 1004 can include tagging the video files or portions thereof (e.g., time ranges or segments within the video file) with semantic tags that indicate the classifications 430 assigned to each video file or time segment. Each video file or portion thereof may be tagged or classified with an indication of the specific entities (e.g., objects, events, etc.) recognized in the video file and a time range of the video file during which those entities appear in the video file. The time ranges of the video files are referred to as time segments, snippets, portions, clips, or analogous terminology throughout the present disclosure. Examples of tags that can be assigned to various video files include tags denoting various types of objects or persons detected in the video files (e.g., vehicle, fence, stroller, person, security person, maintenance person, etc.), characteristics or qualities of the detected objects or persons (e.g., red shirt, black pants, hat, tall, short, male/female, delivery truck, passenger vehicle, vehicle (car), etc.), events or activities depicted in the video files (e.g., person running, vehicle moving, vehicle parking, vehicle collision, snow falling, child playing, etc.).

In various implementations, the tags can be assigned to the video files as a whole (e.g., as metadata or otherwise linked to the video files) or to particular segments of the video files. The video files can be broken down into multiple time segments of any duration (e.g., 1 second, 10 seconds, 30 seconds, 1 minute, 10 minutes, 1 hour, etc.) and each segment is assigned a plurality of tags according to the particular types of persons, objects, events, activities, or other entities detected in the segment by the foundation AI model. The breakdown of the video files can be based on predetermined intervals (e.g., breaking each video file into 10-second segments) regardless of the specific events or entities detected in each segment or may be based on the times at which various entities or events are detected in the video files (e.g., a 10-second interval surrounding a time at which an entity or event is detected). The video analysis and search system 402 can be configured to create multiple clips, snippets, portions, etc. of the video files by cutting the video files into the time segments. The classified video files may be stored in a database accessible to the building system, video analysis and search system 402 and/or security system. The tags can be used to index the video files and/or the segments of the video files and can be used to retrieve relevant video files/segments in response to a search query.

Process 1000 is shown to include receiving a natural language search query from a user via a user interface (step 1006) and discerning an intent of the natural language search query and extracting entities (step 1008). The natural language search query (e.g., natural language input 802) can be entered via a text box of a graphical user interface (e.g., as freeform text) such as user interface 800 shown in FIG. 8, received via a microphone or other user interface device configured to capture audio data, converted from handwriting, drawings, or other freeform inputs or otherwise received in any modality of input. Several examples of user interfaces which can be used to receive the natural language search query are shown and described in greater detail with reference to FIGS. 11-22. Discerning an intent of the natural language search query may include processing the natural language search query using any of the techniques described in U.S. Pat. No. 11,195,401 granted Dec. 7, 2021, U.S. Pat. No. 11,657,465 granted May 23, 2023, and/or U.S. patent application Ser. No. 16/673,738 filed Nov. 4, 2019, the entire disclosures of which are incorporated by reference herein. Step 1008 may include extracting entities that correspond to the discerned intent, which may be the same as or different than the particular terms entered via the natural language search query. Steps 1006 and 1008 may be performed before the video files are obtained or classified in step 1004 (e.g., if the search query is used to define one or more rules used for analyzing live video) or after the video files are obtained or classified in step 1004 (e.g., if the search query is used to search an existing database of stored video files).

Process 1000 is shown to include searching the classified video files using the intent and entities extracted from the natural language search query (step 1010). Step 1010 may include searching the tags or other classifications 430 assigned to the video files/segments in step 1004 to identify particular video files or segments that are relevant to the extracted intent and entities. Step 1010 can include assigning a relevancy score to each video file or segment based on how well the video file or segment matches the intent and entities. The relevant video files and segments (e.g., having a relevancy score above a threshold, having the highest relevancy scores, etc.) may be selected as results of the search and presented to the user via a user interface (step 1012). The video files returned as results of the search can be presented as playable videos via the user interface. Playable videos may include the source video files, edited or processed versions of the video files (e.g., with supplemental annotations), dynamic (video) thumbnails created from the video files, animations or rendered graphics created from the video files (e.g., animated.gif files created from the video files), or any other format that allows a user to play the video files or view the dynamic content of the video files via the user interface. The user interface may allow each video file or segment to be played directly from the user interface and/or may include supplemental annotations marking the locations of particular objects, persons, events, or other entities, as shown in FIG. 9 (e.g., supplemental annotations 902 and text descriptors 904). Several examples of user interfaces which can be used to present the relevant video files and segments in step 1012 are described in greater detail with reference to FIGS. 11-22.

Step 1012 can include refining or updating the search results based on additional input provided via the natural language interface. For example, the foundation AI model can be configured to engage in natural language conversation with a user via the user interface (e.g., functioning as a chat bot) and ask the user questions to help refine the search query and the set of search results. In this way, the user can provide more specific input and the foundation AI model can assist the user in providing additional information to return more relevant, additional, or specific search results. As another example, the initial set of search results may include a video file that depicts a particular person of interest (e.g., a suspected trespasser, a particular employee, etc.). Upon selecting or viewing the initial search results or video file, the user may ask the foundation AI model to "show me all videos or images with this person" and the foundation AI model may run an updated search to find other videos and/or images depicting the same person.

Process 1000 may include performing or triggering an automated action in response to detecting one or more objects or events indicated by the search query in the video files. The automated action may include at least one of sending an alert to a user indicating the one or more objects or events detected in the video files (e.g., an email of the video files, a pop-up message, a text message, a push notification via a mobile application, etc.), raising an alarm indicating the one or more objects or events, dispatching security personnel to respond to the one or more objects or events, controlling or shutting-down building equipment to address a fault condition indicated by the one or more objects or events, locking one or more doors in response to detecting the one or more objects or events, and/or any other action that can be performed or triggered in the context of a building security system or building management system.

Referring now to FIGS. 11-22, among others, several examples of user interfaces 1100-2200 which can be used to receive a natural language search query and present video files/segments are results of the natural language search query are shown, according to an exemplary implementation. All of the user interfaces 1100-2200 can be generated by the video analysis and search system 402 (e.g., by the application manager 432) and presented via user devices 408. The user devices 408 can include a local a user interface of the video analysis and search system 402 (e.g., a monitor, computer workstation, user terminal etc.) or a remote user device (e.g., a user's computer, mobile device, etc.) which communicates with the video analysis and search system 402 via a network (e.g., a LAN, WAN, the internet, etc.). All of the functionality described with reference to the user interfaces 1100-2200 may be functionality of the video analysis and search system 402 and may be performed by various components thereof.

Figure 11:
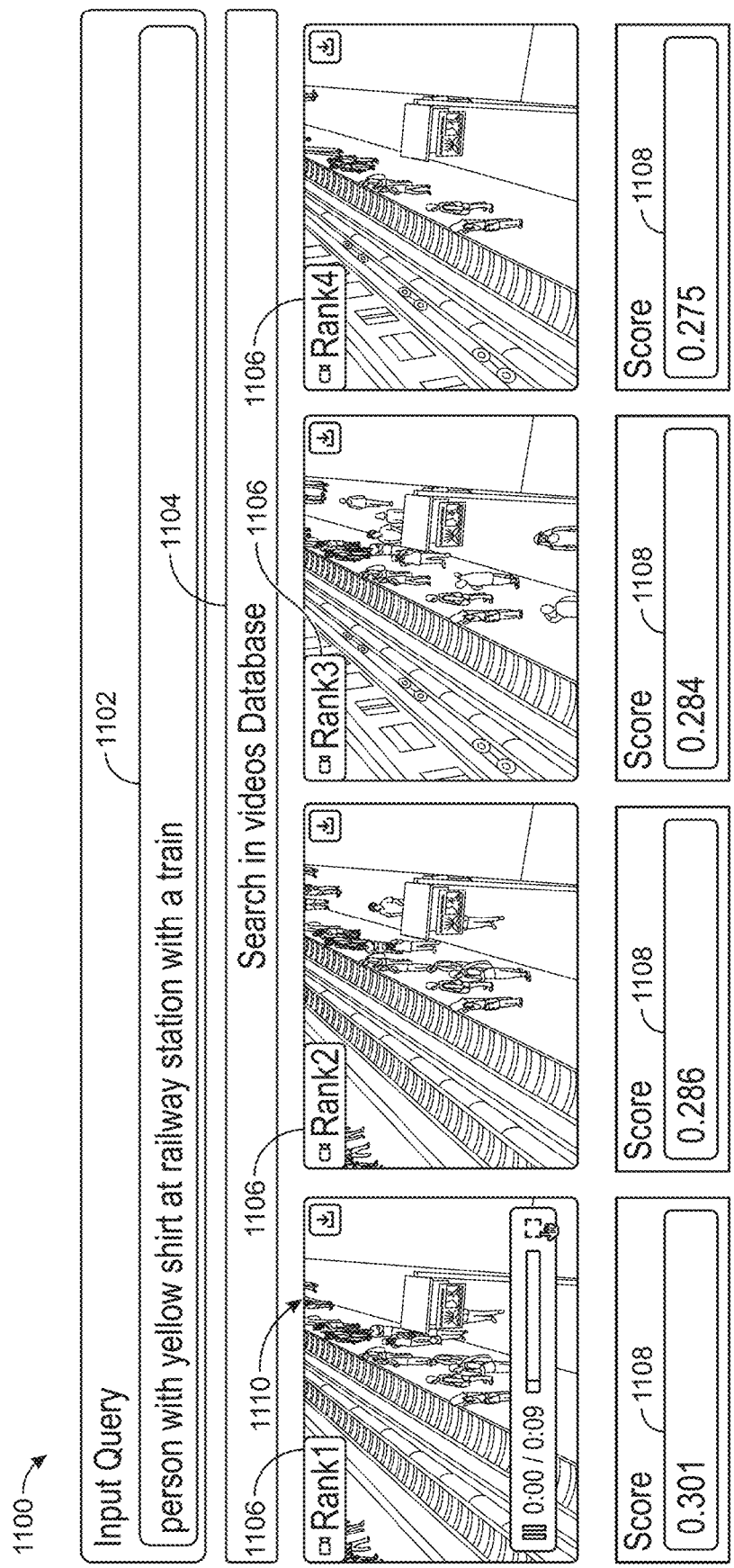
FIG. 11 illustrates a user interface which can be used to receive a natural language search query and present video search results, according to some implementations.
Figure 12:
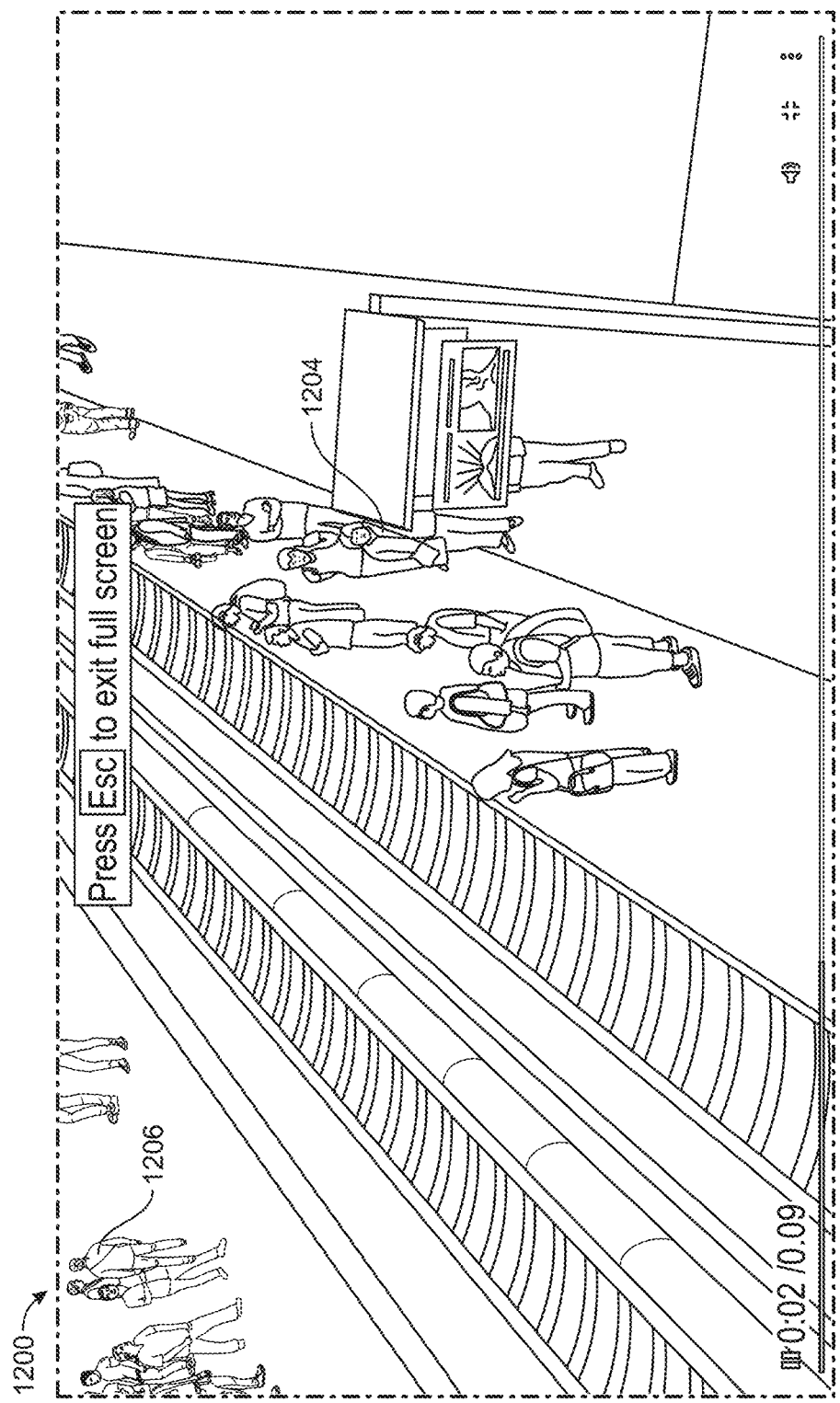
FIG. 12 illustrates an expanded view of one of the video search results shown in FIG. 11, according to some implementations.

Referring to FIGS. 11-12, among others, the user interface 1100 is shown to include a text box 1102 which allows a user to enter a natural language query. In the example shown, the natural language text is "person with yellow shirt at railway station with a train." The user interface 1100 is shown to include a search button 1104 (e.g., "search in videos database") which can be selected to search the database of video files. In response to initiating the search, the user interface 1100 may leverage (e.g., use, call, execute, run, etc.) a foundation AI model as described with reference to FIGS. 4 and 10 (e.g., the model 422) to search the database of video files/segments and identify the most relevant videos/segments as search results 1110.

The video files and segments returned as search results 1110 may be ordered or ranked according to their relevancy scores 1108 and presented in the assigned order (e.g., with the most relevant video files/segments presented first). The user interface 1100 can indicate the rank 1106 assigned to each video file or segment (e.g., "Rank 1," "Rank 2," etc.) and/or the relevancy score 1108 assigned to each video file or segment (e.g., "score 0.301," "score 0.286," etc.). The user interface 1100 may allow the video files and segments to be played directly from the user interface 1100. For example, a user may click or select a video file via the user interface 1100 to start playback of the video file. The user interface 1100 may allow the selected video file 1200 to be expanded (e.g., zooming in, full-screen view, etc.) as shown in FIG. 12. As can be seen from FIG. 12, the selected video file 1200 depicts a railway station and a person with a yellow shirt 1204 and 1206.

Figure 13:
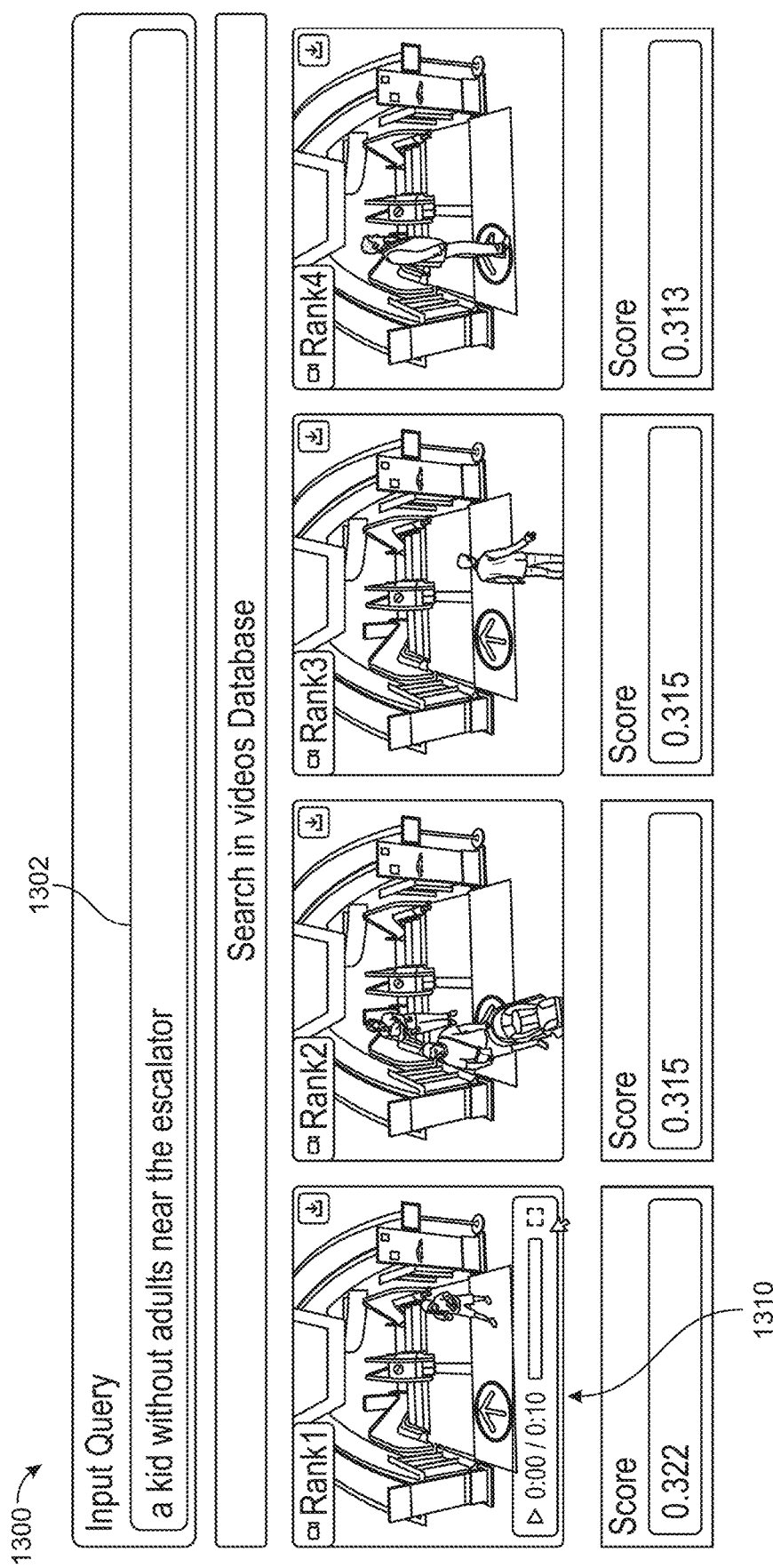
FIG. 13 illustrates another example of a user interface which can be used to receive a natural language search query and present video search results, according to some implementations.
Figure 14:
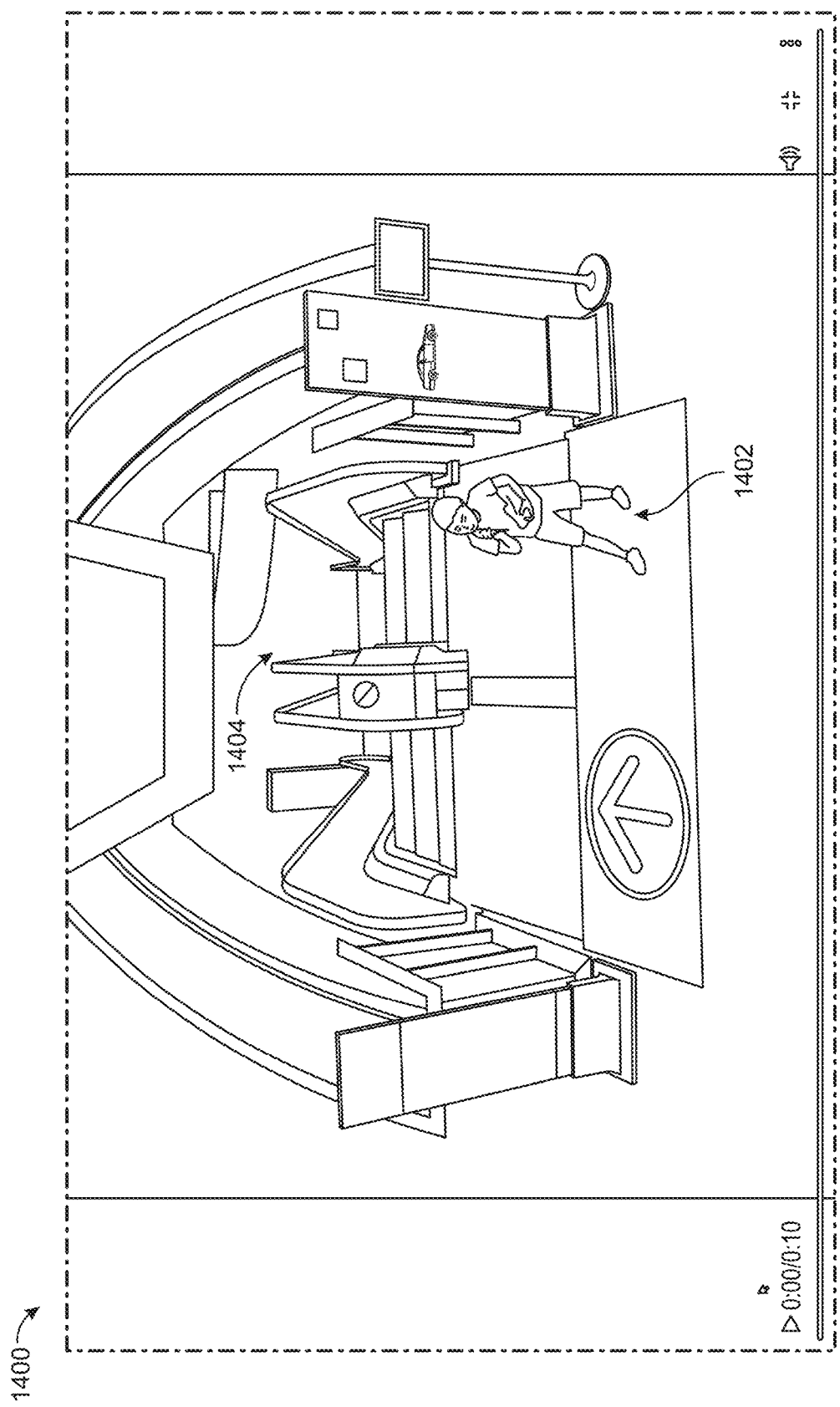
FIG. 14 illustrates an expanded view of one of the video search results shown in FIG. 13, according to some implementations.

Referring now to FIGS. 13-14, among others, a user interface 1300 is shown with another example of a natural language search query 1302 and corresponding video search results 1310, according to an exemplary implementation. In the example shown in FIG. 13, the natural language search query 1302 is "a kid without adults near the escalator." The foundation AI model can be configured to parse the natural language text to identify the relevant concepts or entities such as "kid," "adults," and "escalator." The foundation AI model may further use natural language processing to understand the relationships between the entities. For example, the foundation AI model may understand that "without adults" means that the "kid" is present and the "adults" are not. The foundation AI model may further understand that "near" implies a spatial proximity between the "kid" and the "escalator." FIG. 14 shows an expanded view 1400 of one of the search results 1310 shown in FIG. 13 depicting a child 1402 standing near an escalator 1404 without adults.

Figure 15:
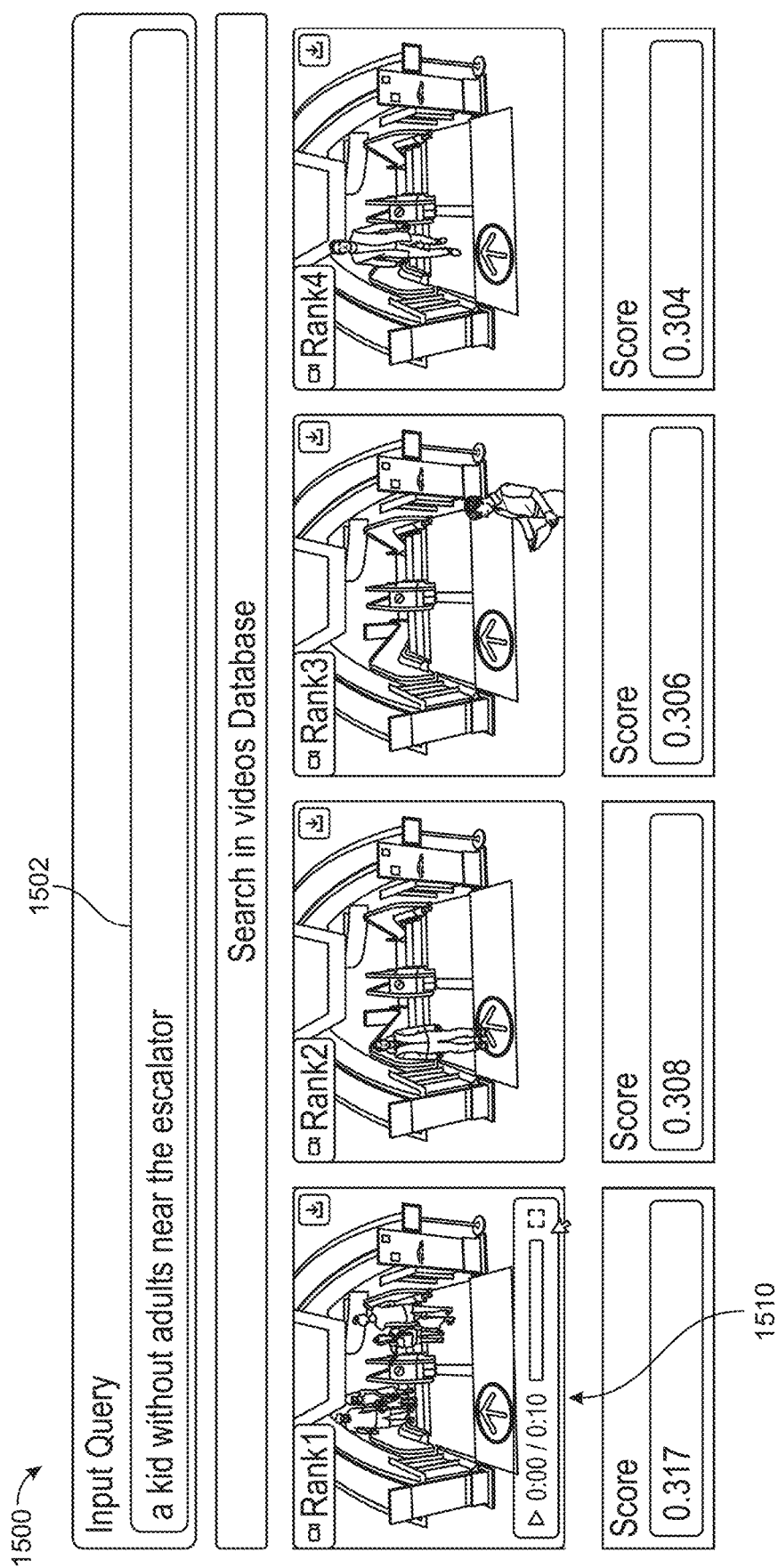
FIG. 15 illustrates another example of a user interface which can be used to receive a natural language search query and present video search results, according to some implementations.
Figure 16:
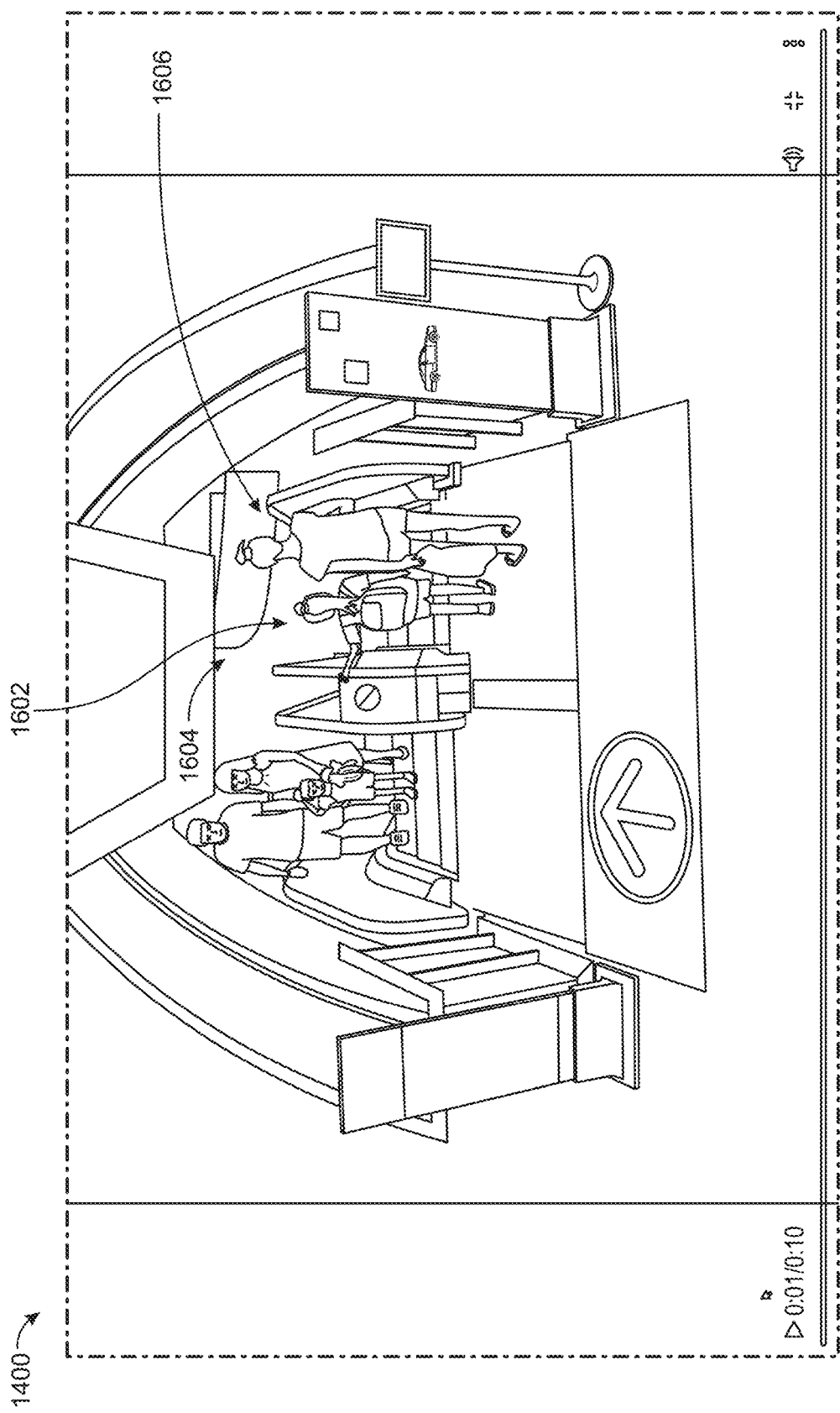
FIG. 16 illustrates an expanded view of one of the video search results shown in FIG. 15, according to some implementations.

Referring now to FIGS. 15-16, among others, a user interface 1500 is shown with another example of a natural language search query 1502 and corresponding video search results 1510, according to an exemplary implementation. In the example shown in FIG. 15, the natural language search query 1502 is "a kid with family near the escalator." The foundation AI model can be configured to parse the natural language text to identify the relevant concepts or entities such as "kid," "family," and "escalator." The foundation AI model may further use natural language processing to understand the relationships between the entities. For example, the foundation AI model may understand that "with family" means that both the "kid" and the "family" are present. The foundation AI model may further understand that "near" implies a spatial proximity between the "kid," the "family," and the "escalator." FIG. 16 shows an expanded view 1600 of one of the search results 1510 shown in FIG. 15 depicting a child 1602 standing near an escalator 1604 with her family 1606.

Figure 17:
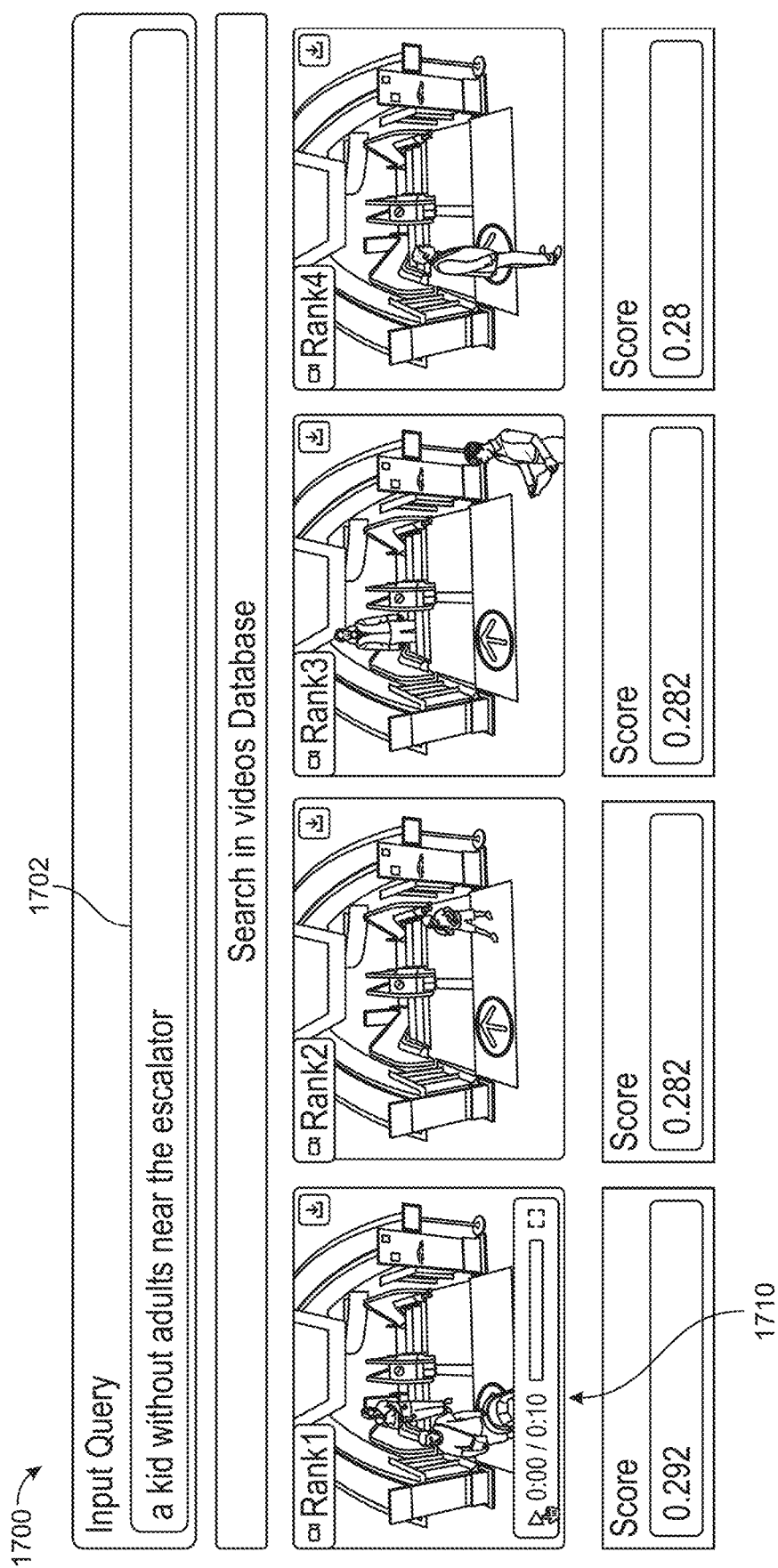
FIG. 17 illustrates another example of a user interface which can be used to receive a natural language search query and present video search results, according to some implementations.
Figure 18:
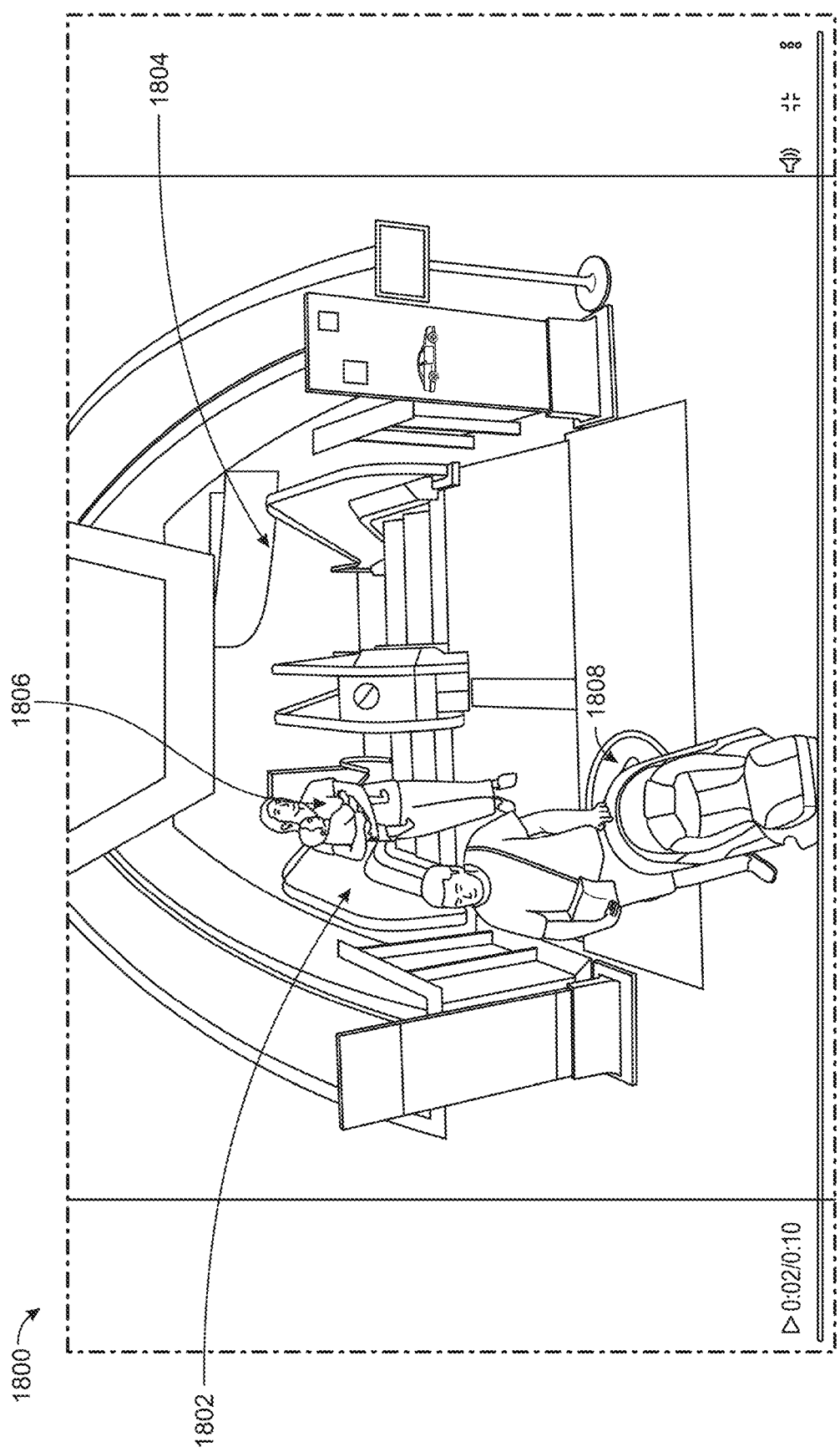
FIG. 18 illustrates an expanded view of one of the video search results shown in FIG. 17, according to some implementations.

Referring now to FIGS. 17-18, among others, a user interface 1700 is shown with another example of a natural language search query 1702 and corresponding video search results 1710, according to an exemplary implementation. In the example shown in FIG. 17, the natural language search query 1702 is "person with baby and stroller near the escalator." The foundation AI model can be configured to parse the natural language text to identify the relevant concepts or entities such as "person," "baby," "stroller," and "escalator." The foundation AI model may further use natural language processing to understand the relationships between the entities. For example, the foundation AI model may understand that "with baby and stroller" means that all of the "person," the "baby," and the "stroller" are present. The foundation AI model may further understand that "near" implies a spatial proximity between the "person," the "baby," the "stroller" and the "escalator." FIG. 18 shows an expanded view 1800 of one of the search results 1710 shown in FIG. 17 depicting two adults 1802 standing near an escalator 1804 with a baby 1806 and a stroller 1808.

Figure 19:
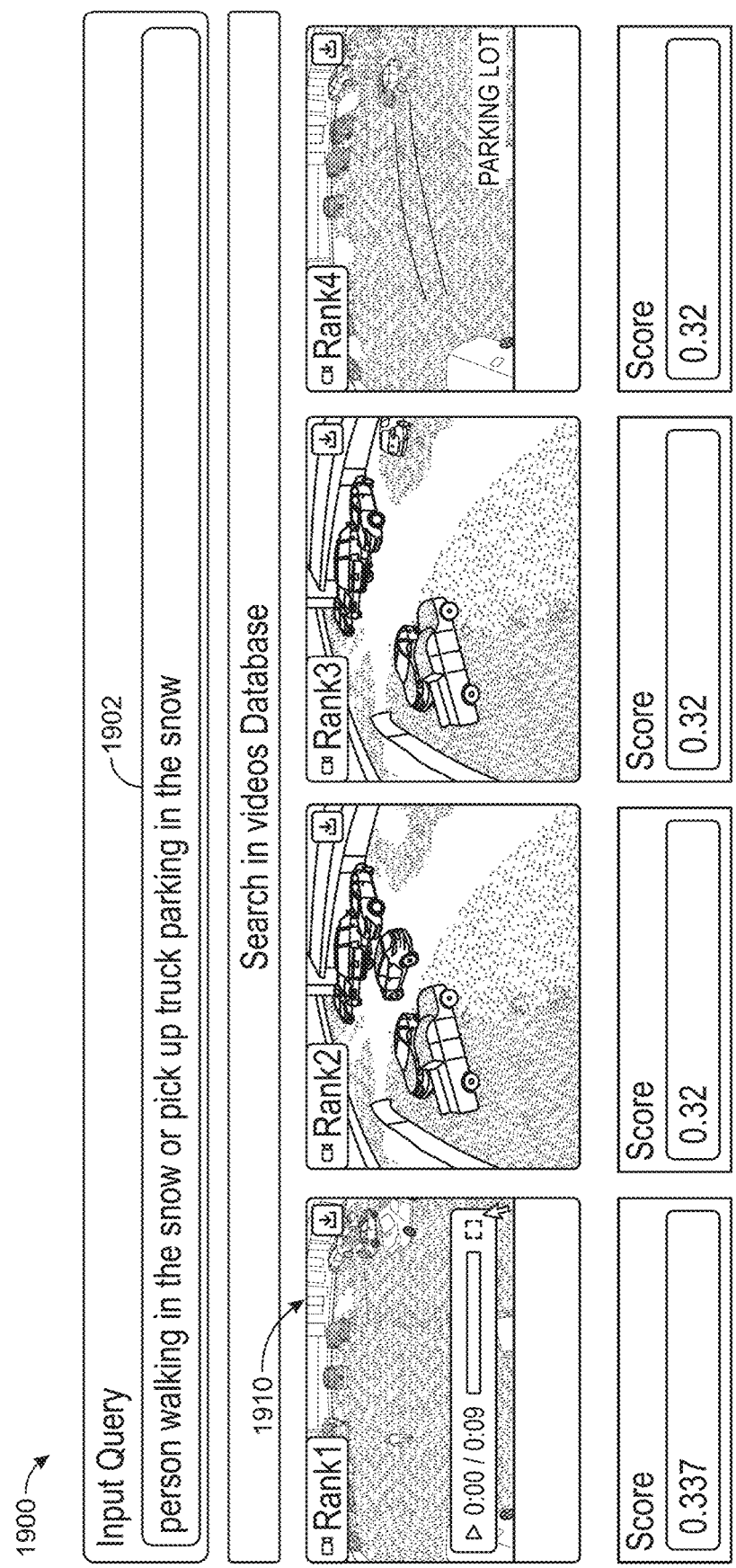
FIG. 19 illustrates another example of a user interface which can be used to receive a natural language search query and present video search results, according to some implementations.
Figure 20:
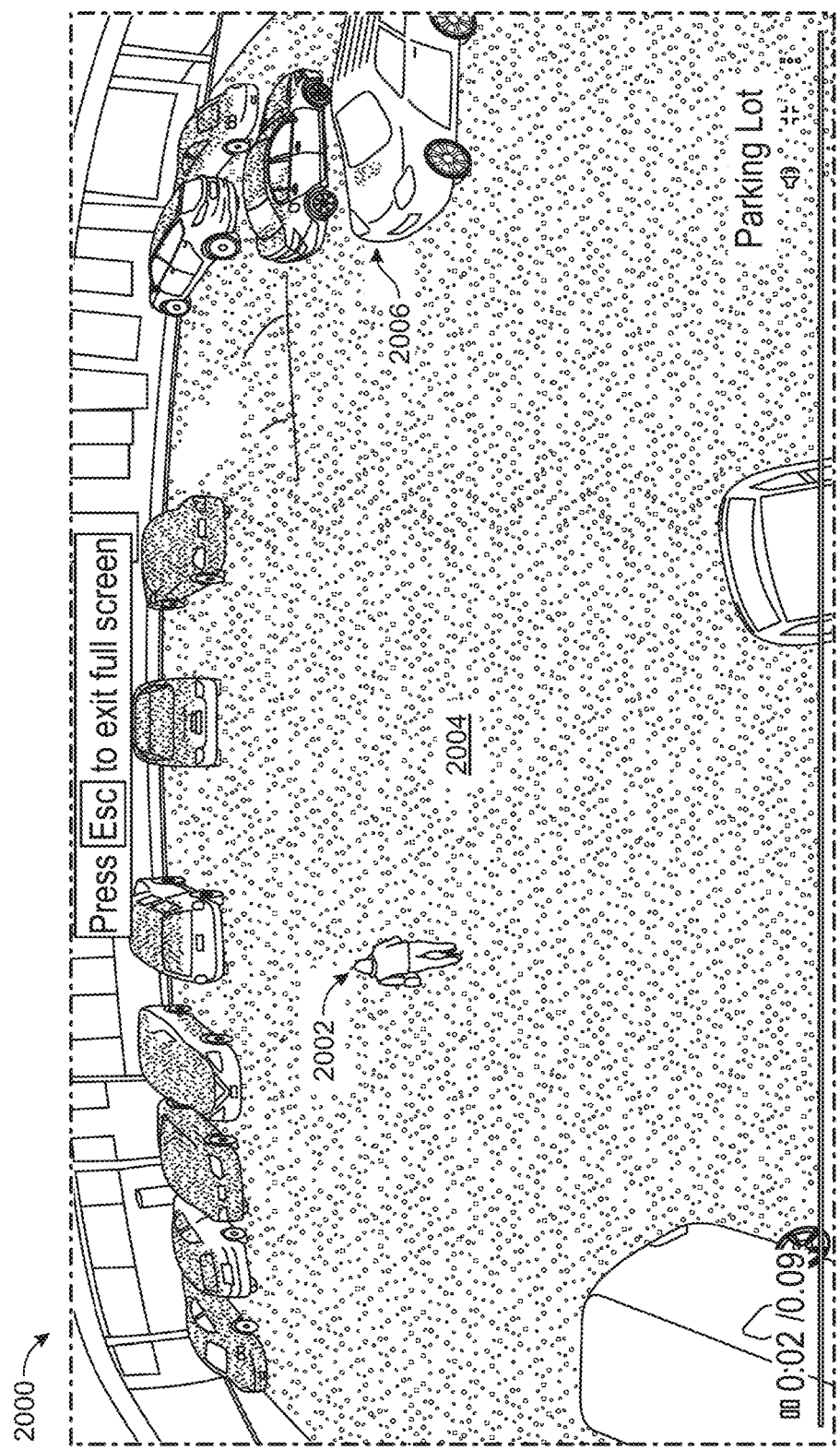
FIG. 20 illustrates an expanded view of one of the video search results shown in FIG. 19, according to some implementations.

Referring now to FIGS. 19-20, among others, a user interface 1900 is shown with another example of a natural language search query 1902 and corresponding video search results 1910, according to an exemplary implementation. In the example shown in FIG. 19, the natural language search query is "person walking in the snow or a pick up truck parking in the snow." The foundation AI model can be configured to parse the natural language text to identify the relevant concepts or entities such as "person," "walking," "snow," "pick up truck," and "parking." The foundation AI model may further use natural language processing to understand the relationships between the entities. For example, the foundation AI model may understand that "person walking" requires the person to be engaged in the act of walking, whereas "pick up truck parking" means that the act of parking must be performed by the pick up truck. The foundation AI model may further understand that "in the snow" implies that these activities are occurring with snow present. FIG. 20 shows an expanded view 2000 of one of the search results 1910 shown in FIG. 19 depicting a person 2002 walking in a snowy parking lot 2004 and a vehicle 2006 about to park. Notably, the foundation AI model may be capable of detecting the particular actions of "walking" and "parking" and can rapidly identify video files or segments that depict such actions.

Figure 21:
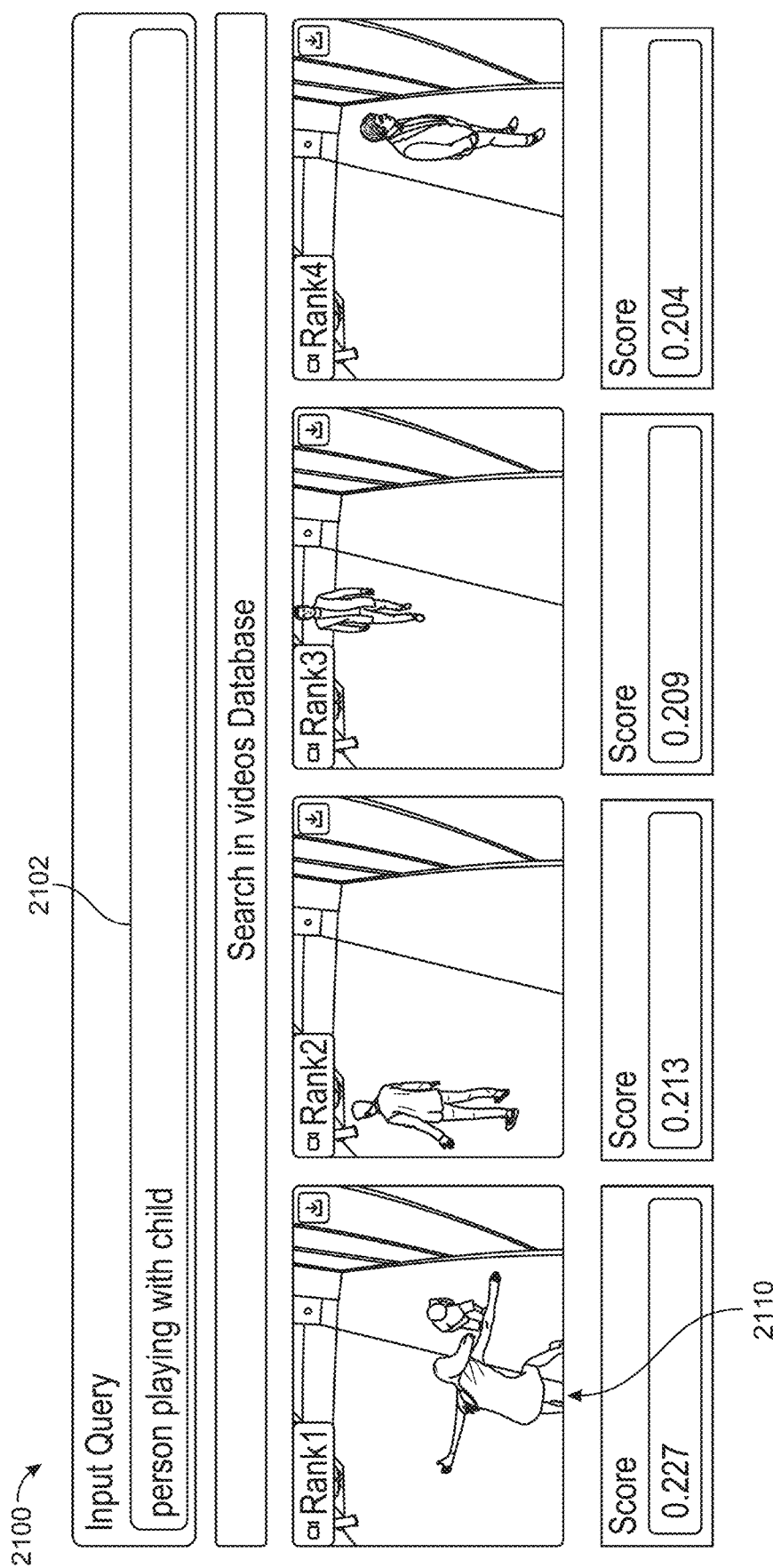
FIG. 21 illustrates another example of a user interface which can be used to receive a natural language search query and present video search results, according to some implementations.
Figure 22:
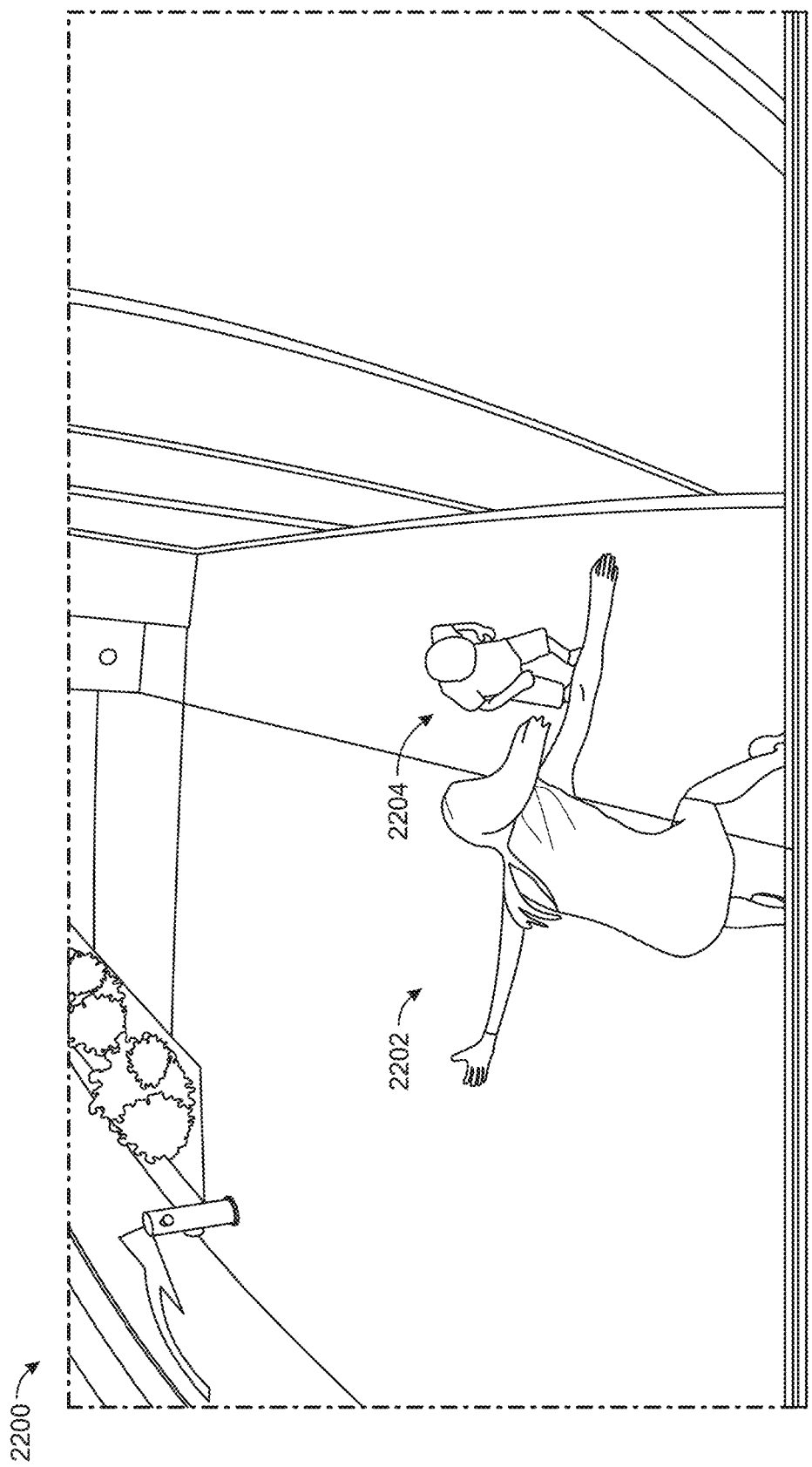
FIG. 22 illustrates an expanded view of one of the video search results shown in FIG. 21, according to some implementations.

Referring now to FIGS. 21-22, among others, a user interface 2100 is shown with another example of a natural language search query 2102 and corresponding video search results 2110, according to an exemplary implementation. In the example shown in FIG. 21, the natural language search query is "person playing with child." The foundation AI model can be configured to parse the natural language text to identify the relevant concepts or entities such as "person," "playing," and "child." The foundation AI model may further use natural language processing to understand the relationships between the entities. For example, the foundation AI model may understand that "person playing" requires the person to be engaged in the act of playing. The foundation AI model may further understand that "with child" implies that both the person and the child are involved in the playing activity. FIG. 22 shows an expanded view 2200 of one of the search results 2110 shown in FIG. 21 depicting a person 2202 and a child 2204 engaged in the act of playing. Advantageously, the foundation AI model may be capable of detecting a wide variety of actions or events (e.g., playing, walking, parking, etc.) that play out over multiple frames of the video file and require multiple frames of video data to accurately discern.

The construction and arrangement of the systems and methods as shown in the various exemplary implementations are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary implementations without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for classifying and searching video files in a building security system, the method comprising:
    applying classifications to video files using an artificial intelligence (AI) model, the AI model trained according to training data comprising images separated into object of interest classes and foreign object classes corresponding to occlusion of an object of interest, the classifications comprising one or more objects or events recognized in the video files by the AI model;
    extracting one or more entities from a search query received, in a natural language format, via a user interface, the one or more entities comprising one or more objects or events indicated by the search query;
    searching the video files using the classifications applied by the AI model and the one or more entities extracted from the search query;
    determining an intent of the search query;
    searching the video files further using the intent to identify one or more video files based on the one or more video files having a relevancy score above a threshold, the relevancy score of each of the one or more video files based on how well the one or more video files match the intent and the one or more entities; and
    presenting the one or more of the video files identified as results of the search query as playable videos via the user interface.

2. The method of claim 1, wherein the AI model comprises at least one of a foundation AI model, a generative AI model, or a large language model.

3. The method of claim 1, wherein the search query is a natural language search query comprising freeform text or verbal inputs provided by a user via the user interface; and
    the method comprises extracting the one or more entities from the natural language search query using natural language processing.

4. The method of claim 1, comprising extracting two or more entities from the search query and discerning an intended relationship between the two or more entities based on information linking the two or more entities in the search query;
    wherein searching the video files comprises using the intended relationship in combination with the two or more entities to identify one or more of the video files classified as having the two or more entities linked by the intended relationship.

5. The method of claim 1, comprising adding supplemental annotations to the video files using the AI model, the supplemental annotations marking an area or location within a video frame of the video files at which a particular object or event is depicted in the video frame;
    wherein presenting one or more of the video files comprises presenting the supplemental annotations overlaid with the video frame via the user interface.

6. The method of claim 1, wherein applying the classifications to the video files comprises:
    processing a timeseries of video frames of a video file recorded over a time period using the AI model to identify an event that begins at a start time during the time period and ends at an end time during the time period; and
    applying a classification to the video file that identifies the event, the start time of the event, and the end time of the event.

7. The method of claim 1, wherein the video files are recorded by one or more cameras and the classifications are applied to the video files during a first time period to generate a database of pre-classified video files;
    wherein the search query is received via the user interface during a second time period after the first time period; and
    wherein searching the video files comprises searching the database of the pre-classified video files using the one or more entities extracted from the search query after the video files are classified.

8. The method of claim 1, wherein the search query is received via the user interface and the one or more entities are extracted from the search query during a first time period to generate a stored rule based on the search query;
    wherein the video files comprise live video streams received from one or more cameras and the classifications are applied to the live video streams during a second time period after the first time period; and
    wherein searching the video files comprises searching the live video streams using the stored rule to determine whether the one or more entities extracted from the search query are depicted in the live video streams.

9. The method of claim 1, comprising cutting the video files to create one or more snippets of the video files based on an output of the AI model indicating one or more times at which the one or more entities extracted from the search query appear in the video files; and
    presenting the one or more snippets of the video files as the results of the search query via the user interface.

10. The method of claim 1, wherein searching the video files comprises determining a relevance score or ranking for each of the video files using the classifications applied by the AI model and the one or more entities extracted from the search query; and
    the method comprising presenting the relevance score or ranking for each of the video files presented as results of the search query via the user interface.

11. A system for classifying and searching video files in a building security system, the system comprising:

one or more processing circuits comprising one or more processors and memory storing instructions that, when executed by the one or more processors, cause the one or more processors to perform operations comprising:
applying classifications to video files using an artificial intelligence (AI) model, the AI model trained according to training data comprising images separated into object of interest classes and foreign object classes corresponding to occlusion of an object of interest, the classifications comprising one or more objects or events recognized in the video files by the AI model;
extracting one or more entities from a search query received, in a natural language format, via a user interface, the entities comprising one or more objects or events indicated by the search query;
searching the video files using the classifications applied by the AI model and the one or more entities extracted from the search query;
determining an intent of the search query;
searching the video files further using the intent to identify one or more video files based on the one or more video files having a relevancy score above a threshold, the relevancy score of each of the one or more video files based on how well the one or more video files match the intent and the one or more entities; and
presenting the one or more video files identified as results of the search query as playable videos via the user interface.

12. The system of claim 11, wherein the AI model comprises at least one of a foundation AI model, a generative AI model, or a large language model.

13. The system of claim 11, wherein the search query is a natural language search query comprising freeform text or verbal inputs provided by a user via the user interface; and
the operations comprising extracting the one or more entities from the natural language search query using natural language processing.

14. The system of claim 11, the operations comprising extracting two or more entities from the search query and discerning an intended relationship between the two or more entities based on information linking the two or more entities in the search query;
wherein searching the video files comprises using the intended relationship in combination with the two or more entities to identify one or more of the video files classified as having the two or more entities linked by the intended relationship.

15. The system of claim 11, the operations comprising adding supplemental annotations to the video files using the AI model, the supplemental annotations marking an area or location within a video frame of the video files at which a particular object or event is depicted in the video frame;
wherein presenting one or more of the video files comprises presenting the supplemental annotations overlaid with the video frame via the user interface.

16. The system of claim 11, wherein applying the classifications to the video files comprises:
processing a timeseries of video frames of a video file recorded over a time period using the AI model to identify an event that begins at a start time during the time period and ends at an end time during the time period; and
applying a classification to the video file that identifies the event, the start time of the event, and the end time of the event.

17. The system of claim 11, wherein the video files are recorded by one or more cameras and the classifications are applied to the video files during a first time period to generate a database of pre-classified video files;
wherein the search query is received via the user interface during a second time period after the first time period; and
wherein searching the video files comprises searching the database of the pre-classified video files using the one or more entities extracted from the search query after the video files are classified.

18. The system of claim 11, wherein the search query is received via the user interface and the one or more entities are extracted from the search query during a first time period to generate a stored rule based on the search query;
wherein the video files comprise live video streams received from one or more cameras and the classifications are applied to the live video streams during a second time period after the first time period; and
wherein searching the video files comprises searching the live video streams using the stored rule to determine whether the one or more entities extracted from the search query are depicted in the live video streams.

19. The system of claim 11, the operations comprising cutting the video files to create one or more snippets of the video files based on an output of the AI model indicating one or more times at which the one or more entities extracted from the search query appear in the video files; and
presenting the one or more snippets of the video files as the results of the search query via the user interface.

* * * * *